US008667849B2

(12) United States Patent
Sato

(10) Patent No.: US 8,667,849 B2
(45) Date of Patent: Mar. 11, 2014

(54) PRESSURE SENSOR

(75) Inventor: Kenta Sato, Kamiina-gun (JP)

(73) Assignee: Seiko Epson Corporation (JP)

( * ) Notice: Subject to any disclaimer, the term of this patent is extended or adjusted under 35 U.S.C. 154(b) by 192 days.

(21) Appl. No.: 13/182,666

(22) Filed: Jul. 14, 2011

(65) Prior Publication Data
US 2012/0073380 A1    Mar. 29, 2012

(30) Foreign Application Priority Data
Sep. 29, 2010 (JP) ................. 2010-219087

(51) Int. Cl.
*G01L 9/00* (2006.01)

(52) U.S. Cl.
USPC .............................. 73/723; 73/715; 361/283.4

(58) Field of Classification Search
None
See application file for complete search history.

(56) References Cited

U.S. PATENT DOCUMENTS

| | | | |
|---|---|---|---|
| 4,309,908 A | 1/1982 | Rapp et al. | |
| 4,384,495 A | 5/1983 | Paros | |
| 4,406,966 A | 9/1983 | Paros | |
| 5,388,462 A * | 2/1995 | Delatorre | 73/718 |
| 5,824,910 A * | 10/1998 | Last et al. | 73/715 |
| 6,055,869 A * | 5/2000 | Stemme et al. | 73/861.71 |
| 6,422,077 B1 * | 7/2002 | Krauss et al. | 73/514.25 |
| 6,848,320 B2 * | 2/2005 | Miyajima et al. | 73/763 |
| 6,860,154 B2 | 3/2005 | Yamamoto et al. | |
| 7,274,002 B2 * | 9/2007 | Stewart | 219/209 |
| 7,296,473 B2 | 11/2007 | Ishii | |
| 7,461,559 B2 * | 12/2008 | Takizawa | 73/777 |
| 7,681,457 B2 * | 3/2010 | Jakobsen | 73/721 |
| 8,096,187 B2 * | 1/2012 | Sato | 73/717 |
| 2009/0241678 A1 | 10/2009 | Motoyama | |
| 2009/0241679 A1 | 10/2009 | Motoyama | |
| 2009/0308164 A1 | 12/2009 | Motoyama | |
| 2009/0308168 A1 | 12/2009 | Motoyama | |
| 2010/0018318 A1 | 1/2010 | Watanabe et al. | |
| 2010/0107769 A1 | 5/2010 | Ochs et al. | |
| 2010/0212435 A1 | 8/2010 | Sato | |
| 2010/0224003 A1 | 9/2010 | Watanabe et al. | |
| 2010/0275698 A1 | 11/2010 | Motoyama | |
| 2012/0031189 A1 | 2/2012 | Sato | |
| 2012/0073380 A1 | 3/2012 | Sato | |
| 2012/0210799 A1 | 8/2012 | Motoyama | |

FOREIGN PATENT DOCUMENTS

| | | |
|---|---|---|
| CN | 101738288 A | 6/2010 |
| JP | 56-119519 | 9/1981 |
| JP | 57-113335 | 7/1982 |
| JP | 64-009331 | 1/1989 |

(Continued)

*Primary Examiner* — Lisa Caputo
*Assistant Examiner* — Jermaine Jenkins
(74) *Attorney, Agent, or Firm* — Harness, Dickey & Pierce, P.L.C.

(57) ABSTRACT

A pressure sensor includes: a container; a pressure receiving member which forms apart of the container; a pressure sensitive element which has a pressure sensing portion and a pair of base portions connected to both ends of the pressure sensing portion, and which has a detection axis parallel to a line connecting the base portions, and in which the detection axis is parallel to a displacement direction of the pressure receiving member, and which detects pressure based on displacement of the pressure receiving member; and a gate-shaped frame which includes a pair of shock absorbing portions that interposes the pressure sensitive element and is connected to a side of the pressure receiving member close to the peripheral portion or a side of the container close to the pressure receiving member and a beam portion that connects distal ends of the shock absorbing portions.

21 Claims, 13 Drawing Sheets

(56) References Cited

FOREIGN PATENT DOCUMENTS

| JP | 64-009332 | | | 1/1989 |
| JP | 02-228534 | | | 9/1990 |
| JP | 06186106 | A | * | 7/1994 |
| JP | 2002-214058 | | | 7/2002 |
| JP | 2005-121628 | | | 5/2005 |
| JP | 2007-057395 | | | 3/2007 |
| JP | 2008-232886 | | | 10/2008 |
| JP | 2009-258085 | | | 11/2009 |
| JP | 2010-019826 | | | 1/2010 |
| JP | 2010-025582 | | | 2/2010 |
| JP | 2010-048798 | | | 3/2010 |
| JP | 2010-203977 | | | 9/2010 |
| JP | 2011095188 | A | * | 5/2011 |

\* cited by examiner

PRESSURE SENSOR

BACKGROUND

1. Technical Field

The present invention relates to a pressure sensor, and more particularly to a pressure sensor capable of suppressing measurement errors due to a change in temperature.

2. Related Art

In the related art, pressure sensors which use a piezoelectric vibrating element as a pressure sensitive element are known such as a hydraulic pressure meter, a barometer, a differential pressure meter, and the like. In a pressure sensor using a piezoelectric vibrating element, when pressure is applied to the piezoelectric vibrating element in the detection axis direction thereof, the resonance frequency of the piezoelectric vibrating element changes, and pressure applied to the pressure sensor is detected from a change in the resonance frequency.

JP-A-2007-57395, JP-A-2005-121628, and JP-A-2010-25582 disclose pressure sensors that use a piezoelectric vibrator as a pressure sensitive element. FIG. 13 shows a pressure sensor disclosed in JP-A-2007-57395. The pressure sensor 201 disclosed in JP-A-2007-57395 includes an airtight case 202 having first and second pressure inlet openings 203a and 204a respectively on first and second walls 203 and 204 facing each other, a first cylindrical bellows 210 of which one end is fixed to the first wall 203 and which has a shaft hole communicating with the first pressure inlet opening 203a, a second cylindrical bellows 211 of which one end is fixed to the second wall 204 and which has a shaft hole communicating with the second pressure inlet opening 204a and is disposed in series with the first bellows 210, a vibration element attachment pedestal 215 that is disposed between and fixed to the other ends of the first and second bellows 210 and 211, a thin plate-like piezoelectric vibrating element 220 that is supported by the vibration element attachment pedestal 215, and an oscillation circuit 230 that is electrically connected to an electrode pattern on the piezoelectric vibrating element 220. The piezoelectric vibrating element 220 has one end fixed to the second wall 204 and has the other end fixed to the vibration element attachment pedestal 215. A piezoelectric reinforcement plate 221 is fixed between the second wall 204 and the vibration element attachment pedestal 215 at a position facing the piezoelectric vibrating element 220 with the second bellows 211 disposed therebetween. The inner wall of the airtight case 202 and the vibration element attachment pedestal 215 are connected by an elastic reinforcement member 250. The same technique is disclosed in JP-A-2005-121628.

The pressure sensor 201 disclosed in JP-A-2007-57395 has a configuration in which the first and second bellows 210 and 211 are disposed in series or coaxially within a case maintained in a vacuum or inert-gas atmosphere. The pressure sensor 201 uses a principle in which the resonance frequency of the piezoelectric vibrating element 220 changes when a displacement force in the axial direction of the respective bellows generated by pressure applied to the shaft holes of the respective bellows is transmitted to the piezoelectric vibrating element 220 disposed in the airtight case 202. With this configuration, it is possible to realize a high-accuracy pressure sensor at a low cost without using an expensive electrodeposited bellows or a complex supporting structure. Moreover, since the elastic reinforcement member 250 is disposed between the vibration element attachment pedestal 215 and the inner wall of the airtight case 202, it is possible to increase the strength against impact from a direction vertical to the axial direction.

FIG. 14 shows a pressure sensor disclosed in JP-A-2010-25582. The pressure sensor 310 disclosed in JP-A-2010-25582 includes a cylindrical housing 312, first and second diaphragms 314 and 316 that respectively seal openings at both ends of the housing 312, a first reaction generating portion 320 that is connected to the first diaphragm 314 so as to apply force to the first diaphragm 314 in the opposite direction to the gravity received by the first diaphragm 314 using a first weight 328 by the principle of leverage, a second reaction generating portion 322 that is connected to the second diaphragm 316 so as to apply force to the second diaphragm 316 in the opposite direction to gravity received by the second diaphragm 316 using a second weight 330 by the principle of leverage, and a pressure sensitive element 318 which is disposed inside the housing 312, and in which a force detection direction is set as a detection axis thereof, one end thereof is connected to the first diaphragm 314, and the other end thereof is connected to the second weight 330.

In the above configuration, the pressure sensitive element 318 receives stress in a direction pushing it away from the first diaphragm 314 in response to the pressure received by the first diaphragm 314, whereas the pressure sensitive element 318 receives stress in a direction pulling it toward the second diaphragm 316 in response to the pressure received by the second diaphragm 316. However, when the pressure received by the first and second diaphragm 314 and 316 is the same, although the pressure sensitive element 318 is displaced, no load is applied to the pressure sensitive element 318. Therefore, it is possible to measure relative pressure detected from a pressure difference between the first and second diaphragms 314 and 316. Moreover, since the detection axis of the pressure sensitive element 318 and the displacement direction of the first and second diaphragms 314 and 316 are arranged coaxially, it is possible to accurately measure the pressure difference between the first and second diaphragms 314 and 316.

With the above configuration, the first reaction generating portion 320 always applies force in the opposite direction to a resultant force which is the sum of stress corresponding to bending deformation caused by the gravity received by the first diaphragm 314 and the gravity received by the pressure sensitive element 318. The second reaction generating portion 322 always applies a force in the opposite direction to a resultant force which is a subtraction of the gravity received by the pressure sensitive element 318 from stress corresponding to bending deformation caused by the gravity received by the second diaphragm 316. Therefore, the displacement caused by the gravity received by the first and second diaphragms 314 and 316 is canceled, and the stress applied to the pressure sensitive element 318 caused by the gravity received by the first and second diaphragms 314 and 316 is canceled. Accordingly, the pressure sensitive element 318 detects only the pressure difference between the first and second diaphragms 314 and 316. Thus, it is possible to obtain a pressure sensor 310 in which a change in application of gravitational acceleration and the influence of vibration generated by the change are suppressed.

However, when the temperature changes, thermal deformation is applied to the piezoelectric vibrating element 220 and the pressure sensitive element 318 due to a difference in thermal expansion coefficients between the piezoelectric vibrating element 220 and the airtight case 202 in JP-A-2007-57395 and between the pressure sensitive element 318 and the housing 312 in JP-A-2010-25582. As a result, the resonance frequency changes, and it is difficult to measure pressure accurately.

FIG. 15 shows a pressure sensor disclosed in JP-A-2010-48798. In order to solve the above problems, the pressure sensor 410 disclosed in JP-A-2010-48798 includes a housing 412, a diaphragm 424 which seals an opening 422 of the housing 412 and includes a flexible portion and a peripheral region 424c positioned on the outer side of the flexible portion, and in which one principal surface of the flexible portion is a pressure receiving surface, and a pressure sensitive element 440 which includes a pressure sensing portion and first and second base portions 440a and 440b respectively connected to both ends of the pressure sensing portion, and in which an arrangement direction of the first and second base portions 440a and 440b is parallel to a displacement direction of the diaphragm 424. In the pressure sensor 410, the first base portion 440a is connected to a central portion of the diaphragm 424, which is the rear side of the pressure receiving surface, and the second base portion 440b is connected to the peripheral region 424c on the rear side, or to an inner wall of the housing 412 facing the first base portion 440a, through a connecting member 442.

With this configuration, the first base portion 440a disposed at one end in the detection axis direction of the pressure sensitive element 440 is connected to the central portion of the diaphragm 424 which is displaced by pressure from the outside. The second base portion 440b disposed at the other end on the opposite side of the one end is connected to the peripheral region 424c of the diaphragm 424, which is fixed to the housing 412 and is not displaced by pressure from the outside, or to the inner wall of the housing 412 facing the first base portion 440a, through the connecting member 442. Therefore, the pressure sensor 410, in which the pressure sensitive element 440 receives compressive stress due to pressure from the outside, measures absolute pressure. Moreover, since both ends of the pressure sensitive element 440 are connected to the side of the diaphragm 424, it is possible to reduce pressure measurement errors accompanied by a change in temperature resulting from a difference in the linear expansion coefficients of the pressure sensitive element 440 and the housing 412 which are formed of different materials. Furthermore, by forming the pressure sensitive element 440 integrally with the connecting member 442 using a piezoelectric material, thermal deformation between the pressure sensitive element 440 and the connecting member 442 can be prevented. Thus, it is possible to reduce pressure measurement errors.

However, in the pressure sensor 410 of JP-A-2010-48798, it is possible to prevent the occurrence of thermal deformation in the detection axis direction of the pressure sensitive element 440. However, since the connecting member 442 and the diaphragm 424 are formed of different materials, thermal deformation occurs between the diaphragm 424 and a portion of the connecting member 442 extending in a direction vertical to the detection axis direction of the pressure sensitive element 440. Moreover, since the connecting member 442 receives the thermal deformation, the pressure sensitive element 440 receives the thermal deformation from the connecting member 442. Thus, it is not possible to sufficiently eliminate the effect of thermal deformation.

SUMMARY

An advantage of some aspects of the invention is to provide a pressure sensor capable of suppressing thermal deformation of a pressure sensitive element resulting from a diaphragm as well as suppressing thermal deformation of the pressure sensitive element resulting from a housing.

Application Example 1

This application example of the invention is directed to a pressure sensor including: a container; a pressure receiving member which forms a part of the container and is displaced toward the inner side or the outer side of the container in response to force; a pressure sensitive element which has a pressure sensing portion and a pair of base portions connected to both ends of the pressure sensing portion, and which has a detection axis parallel to a line connecting the base portions, and in which the detection axis is parallel to a displacement direction of the pressure receiving member, and which detects pressure based on displacement of the pressure receiving member; and a gate-shaped frame which includes a pair of shock absorbing portions that interposes the pressure sensitive element and is connected to a side of the pressure receiving member close to the peripheral portion or a side of the container close to the pressure receiving member and a beam portion that connects distal ends of the shock absorbing portions, wherein one of the base portions of the pressure sensitive element is connected to the pressure receiving member, and the other base portion on the opposite side of the base portion is connected to a central portion in a longitudinal direction of the beam portion, and wherein when the length of the pressure sensitive element is $L_A$, the Young's modulus of the pressure sensitive element is $E_A$, the cross-sectional area of the pressure sensitive element is $S_A$, the length of the shock absorbing portion is $L_B$, the Young's modulus of the shock absorbing portion is $E_B$, and the cross-sectional area of the shock absorbing portion is $S_B$, the following relation is satisfied.

$$\frac{E_A L_B S_A}{E_B L_A S_B} \geq 1$$

With this configuration, since the base portions at both ends of the pressure sensitive element are, as a result, connected to the side of the pressure receiving member, it is possible to suppress thermal deformation of the pressure sensitive element resulting from expansion and contraction due to an overall change in temperature of the container. On the other hand, thermal deformation occurs between the frame and the pressure receiving member. However, since the amount of expansion and contraction of the shock absorbing portion that constitutes the frame is larger than the amount of expansion and contraction of the pressure sensitive element in response to this thermal stress, the shock absorbing portion receives most of the thermal deformation applied to the frame. Thus, the pressure sensor is capable of decreasing the thermal deformation applied to the pressure sensitive element and suppressing pressure errors due to a change in temperature. Moreover, the frame can be connected to the side of the container close to the pressure receiving member. With this configuration, since the frame is connected to the container having high rigidity, it is possible to increase the pressure sensitivity of the pressure sensitive element.

Application Example 2

This application example is directed to the pressure sensor of the above application example, wherein when the length in the longitudinal direction of the beam portion is $L_C$, the Young's modulus of the beam portion is $E_C$, the height of the beam portion is $H_C$, and the width of the beam portion is $W_C$, the following relation is satisfied.

$$\frac{E_A L_C^3 S_A}{4 E_C L_A H_C^3 W_C} \le 3$$

With this configuration, it is possible to decrease the thermal deformation of the pressure sensitive element without decreasing the sensitivity of the pressure sensitive element.

Application Example 3

This application example of the invention is directed to the pressure sensor of the above application example, wherein the pressure sensitive element and the frame are integrally formed so that an end portion of the base portion of the pressure sensitive element connected to the pressure receiving member and an end portion of the shock absorbing portion connected to the peripheral portion or the opening are arranged on the same straight line.

With this configuration, it is possible to decrease the thermal deformation between the frame and the pressure sensitive element. Moreover, since the frame and the pressure sensitive element are integrally formed, it is possible to decrease the number of components and realize cost reduction.

Application Example 4

This application example of the invention is directed to the pressure sensor of the above application example, wherein the pressure sensing portion includes at least one columnar beam.

With this configuration, for example, by using one columnar beam, it is possible to improve the pressure sensitivity of the pressure sensitive element.

Application Example 5

This application example of the invention is directed to the pressure sensor of the above application example, wherein the pressure sensitive element and the shock absorbing portion are formed of the same material and have the same lengths in the longitudinal direction thereof.

With this configuration, it is possible to decrease the thermal deformation between the pressure sensitive element and the shock absorbing portion.

Application Example 6

This application example of the invention is directed to the pressure sensor of the above application example, wherein the pressure sensitive element and the shock absorbing portion are formed of the same piezoelectric material so that the longitudinal directions thereof have the same crystal orientation.

With this configuration, even when the pressure sensitive element is formed of a piezoelectric material, by forming the shock absorbing portion using the same piezoelectric material having the same crystal orientation, it is possible to decrease the thermal deformation between the pressure sensitive element and the shock absorbing portion.

Application Example 7

This application example of the invention is directed to the pressure sensor of the above application example, wherein both ends and a central portion in the longitudinal direction of the beam portion have recesses or slits which have the same shape as the distal end of the shock absorbing portion and the base portion of the pressure sensitive element, and the shock absorbing portion and the pressure sensitive element are inserted into the recesses or the slits.

With this configuration, the alignment of the shock absorbing portion and the pressure sensitive element with respect to the beam portion is made easy. Moreover, since the recesses increase the contact area, it is possible to improve the bonding strength.

Application Example 8

This application example of the invention is directed to the pressure sensor of the above application example, wherein the beam portion is formed of a material having the same thermal expansion coefficient as the pressure receiving member.

With this configuration, it is possible to decrease the thermal deformation applied in the longitudinal direction of the beam portion resulting from the pressure receiving member, and accordingly, to decrease the thermal deformation of the pressure sensitive element.

Application Example 9

This application example of the invention is directed to the pressure sensor of the above application example, wherein the pressure receiving member and the beam portion are formed of stainless steel.

With this configuration, when the pressure receiving member is formed of stainless steel, it is possible to obtain the pressure receiving member having sufficient rigidity and high pressure sensitivity. When the beam portion is formed of stainless steel similarly to the pressure receiving member, it is possible to decrease the thermal deformation applied in the longitudinal direction of the beam portion resulting from the pressure receiving member, and accordingly, to decrease the thermal deformation of the pressure sensitive element.

Application Example 10

This application example of the invention is directed to the pressure sensor of the above application example, wherein another set of the pressure receiving member, the pressure sensitive element, and the frame are arranged in the housing.

With this configuration, since two pressure receiving members are formed in one housing, a pressure sensor in which the pressure sensitive element and the frame are provided so as to correspond to each pressure receiving member can be obtained. In this case, since two pressure sensitive elements are located within the same housing, it is possible to obtain a pressure sensor which can measure a pressure difference between the different amounts of pressure applied to the respective pressure receiving members accurately.

BRIEF DESCRIPTION OF THE DRAWINGS

The invention will be described with reference to the accompanying drawings, wherein like numbers reference like elements.

DESCRIPTION OF EXEMPLARY EMBODIMENTS

A pressure sensor according to the invention will be described in detail below with reference to embodiments shown in the accompanying drawings. Note that constituent elements, types, combinations, shapes, relative positions, and the like described in the embodiments are not intended to limit the range of this invention, but are only examples unless there is a specific statement.

First Embodiment

Figure 1:
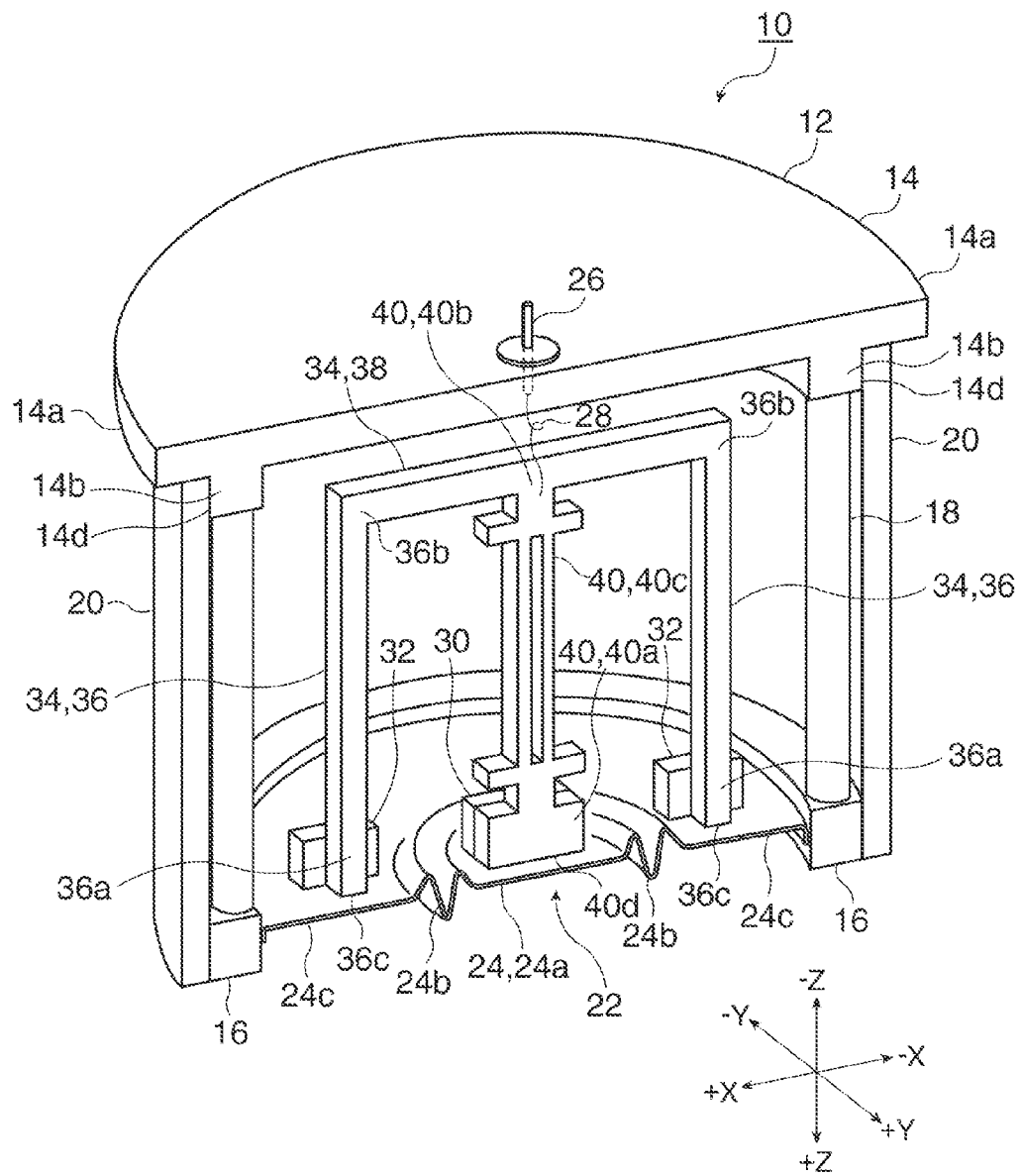
FIG. 1 is a perspective cross-sectional view of a pressure sensor according to a first embodiment, taken along the XZ plane.
Figure 2A:
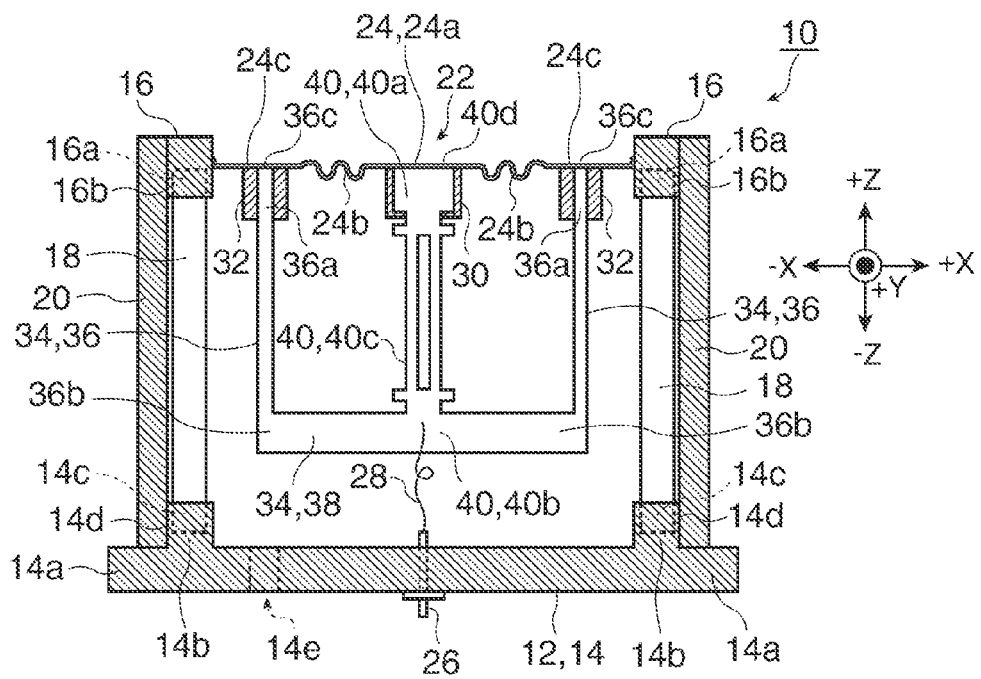
FIGS. 2A and 2B are cross-sectional views of the pressure sensor according to the first embodiment, taken along the XZ and YZ planes, respectively.
Figure 2B:
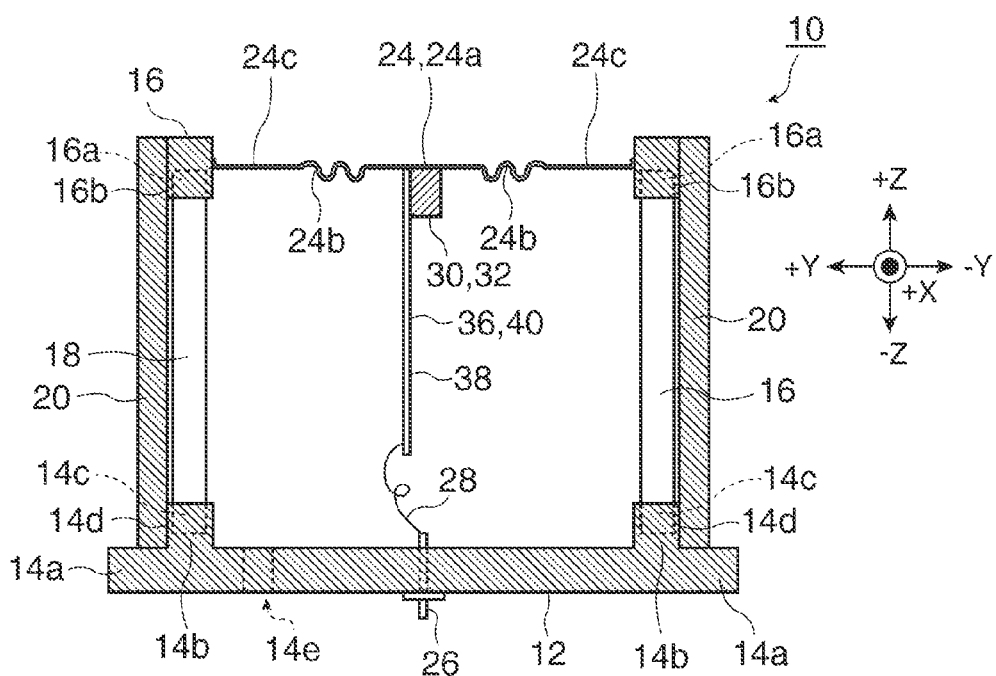

FIG. 1 is a perspective cross-sectional view of a pressure sensor according to a first embodiment, taken along the XZ plane. FIGS. 2A and 2B are cross-sectional views of the pressure sensor according to the first embodiment, taken along the XZ and YZ planes, respectively. Here, the X, Y, and Z axes shown in FIGS. 1, 2A, and 2B constitute an orthogonal coordinate system, and the same is applied to the drawings referred to hereinafter. A pressure sensor 10 according to the first embodiment includes a housing 12 and a diaphragm 24 which serve as a container. A shock absorbing portion 36 and a beam portion 38 which constitute a frame 34, a pressure sensitive element 40, and the like are accommodated in the accommodation space of the container having the diaphragm 24. Moreover, when the inside of the housing 12 is opened to the atmosphere, for example, the pressure sensor 10 can be used as a fluid pressure sensor that receives fluid pressure from outside the diaphragm 24 with reference to atmospheric pressure. Moreover, when the inside of the housing 12 is vacuum-sealed, the pressure sensor 10 can be used as an absolute pressure sensor with reference to a vacuum.

The housing 12 includes a circular flange portion 14, a circular ring portion 16, a supporting shaft 18, and cylindrical side surfaces (side walls) 20.

The flange portion 14 includes an outer peripheral portion 14a that is in contact with the end portions of the cylindrical side surfaces (side walls) 20 and an inner peripheral portion 14b that is formed on the outer peripheral portion 14a to be concentric to the outer peripheral portion 14a so as to protrude in a ring shape having the same diameter as the ring portion 16. The ring portion 16 includes a circular opening 22 which is formed by the inner peripheral edge thereof. The diaphragm 24 is connected to the opening 22 so as to seal the opening 22, and the diaphragm 24 forms apart of the housing 12.

Holes 14c and 16a in which supporting shafts 18 are inserted are formed at predetermined positions of the inner peripheral portion 14b of the flange portion 14 and the mutually facing surfaces of the ring portion 16. Moreover, the holes 14c and 16a are formed at the mutually facing positions. Therefore, when the supporting shafts 18 are inserted into the holes 14c and 16a, the flange portion 14 and the ring portion 16 are connected by the supporting shafts 18. The supporting shafts 18 are rod-like members having predetermined rigidity and extending in the ±Z direction. The supporting shafts 18 are disposed inside the container which includes the housing 12 and the diaphragm 24. When one set of ends of the supporting shafts 18 is inserted into the holes 14c of the flange portion 14 and the other set of ends thereof is inserted into the holes 16a of the ring portion 16, predetermined rigidity is obtained between the flange portion 14, the supporting shafts 18, and the ring portion 16. Although a plurality of supporting shafts 18 is used, the arrangement thereof is optional depending on the design of the positions of the respective holes.

Moreover, hermetic terminals 26 are attached to the flange portion 14. The hermetic terminals 26 are configured to be capable of electrically connecting electrode portions (not shown) of the pressure sensitive element 40 described later and an integrated circuit (IC: not shown) through wires 28. The IC is used for oscillating the pressure sensitive element 40 and is attached to the outer surface of the housing 12 or is disposed outside the housing 12 to be separated from the housing 12.

Although one hermetic terminal 26 is depicted in FIGS. 1, 2A, and 2B, the hermetic terminals 26 are attached to the flange portion 14 in accordance with the total number of electrode portions (not shown) of the pressure sensitive element 40. When the pressure sensor 10 is used as the fluid pressure sensor described above, an air inlet opening 14e is formed on the flange portion 14 so that the inside of the housing 12 can be opened to the atmosphere. The hermetic terminals 26 and the air inlet opening 14e are disposed at any positions of the flange portion 14 such that they do not interfere with each other.

Since both ends of the side surfaces (side walls) 20 are respectively connected to the outer periphery 14d of the inner peripheral portion 14b of the flange portion 14 and the outer periphery 16b of the ring portion 16 of which the opening 22 is covered by the diaphragm 24, the container is sealed. The flange portion 14, the ring portion 16, and the side surfaces (side walls) 20 are preferably formed of metal such as stainless steel. The supporting shafts 18 are preferably formed of ceramics or the like having predetermined rigidity and a low thermal expansion coefficient.

One principal surface of the diaphragm 24 facing the outer surface of the housing 12 is configured as a pressure receiving surface. The pressure receiving surface has a flexible portion which is bent and deformed in response to pressure of a pressure measurement environment (for example, liquid). When the flexible portion is bent and deformed to be displaced toward the inner or outer side (Z-axis direction) of the housing 12, the diaphragm 24 transmits a Z-axis direction compressive or tensile force to the pressure sensitive element 40. Moreover, the diaphragm 24 includes a central portion 24a that is displaced by pressure from the outside, a flexible portion 24b that is disposed on the outer periphery of the central portion 24a so as to be bent and deformed by the pressure from the outside so as to allow the displacement of the central portion 24a, and a peripheral portion 24c that is disposed on the outer side of the flexible portion 24b, namely on the outer periphery of the flexible portion 24b and is bonded and fixed to the inner wall of the opening 22 formed in the ring portion 16. Ideally, the peripheral portion 24c is not displaced and the central portion 24a is not deformed even when pressure is applied thereto.

The surface of the central portion 24a of the diaphragm 24 on the opposite side of the pressure receiving surface is connected to one end (first base portion 40a) in the longitudinal direction (detection axis direction) of the pressure sensitive element 40 described later.

The diaphragm 24 is preferably formed of a material having excellent corrosion resistance such as metal (for example, stainless steel) or ceramics and may be formed of a single crystalline body (for example, quartz crystal) and another amorphous body. For example, when the diaphragm 24 is formed of metal, it may be formed by pressing a base metal material. When the diaphragm 24 is formed of quartz crystal, the diaphragm 24 may be formed by photolithographic etching so that the flexible portion 24b is made thinner than other portions.

In addition, the surface of the diaphragm 24 exposed to the outside may be coated with an anti-corrosion film so as not to be corroded by liquids, gases, or the like. For example, if the diaphragm 24 is formed of metal, the diaphragm 24 may be coated with a nickel compound. Moreover, if the diaphragm 24 is formed of a piezoelectric crystal body such as quartz crystal, the diaphragm 24 may be coated with silicon.

A supporting portion 30 is connected to the central portion 24a of the diaphragm 24, and a pair of supporting portions 32 is connected to the peripheral portion 24c. The first base portion 40a of the pressure sensitive element 40 is connected to the supporting portion 30 connected to the central portion 24a, and a first fixing portion 36a of a shock absorbing portion 36 that constitutes a frame 34 described later is connected to the supporting portions 32 connected to the peripheral portion 24c. The supporting portions 30 and 32 are preferably formed of the same material as the diaphragm 24.

The frame 34 having a gate structure includes a pair of shock absorbing portions 36 and a beam portion 38 connecting the second fixing portions 36b of the shock absorbing portions 36. The frame 34 is formed integrally with the pressure sensitive element 40 using a piezoelectric material such as a quartz crystal, lithium niobate, or lithium tantalate. The pair of shock absorbing portions 36 and the pressure sensitive element 40 are connected to the beam portion 38 so that the longitudinal directions thereof are parallel to each other (in the Z-axis direction).

The shock absorbing portions 36 have the first fixing portions 36a connected to the side surface of the supporting portion 32 and are in contact with the peripheral portion 24c so as to interpose the pressure sensitive element 40 from the X-axis direction. Here, the shock absorbing portions 36 and the pressure sensitive element 40 are connected so that the longitudinal directions thereof are parallel to the displacement direction (the Z-axis direction) of the diaphragm 24. Moreover, the shock absorbing portions 36 have the second fixing portions 36b connected to the beam portion 38, and in the present embodiment, the second fixing portions 36b of the shock absorbing portions 36 are integrated with the beam portion 38 at both ends in the longitudinal direction of the beam portion 38.

The pressure sensitive element 40 includes vibrating arms 40c and first and second base portions 40a and 40b which are formed at both ends of the vibrating arms 40c. The first base portion 40a is connected to the side surface of the supporting portion 30 and is in contact with the central portion 24a. Moreover, the second base portion 40b is connected to the central portion in the longitudinal direction (X-axis direction) of the beam portion 38, and in the present embodiment, the second base portion 40b is integrated with the beam portion 38. Furthermore, the pressure sensitive element 40 includes excitation electrodes (not shown) which are formed on the vibrating arms 40c and the electrode portions (not shown) which are electrically connected to the excitation electrodes (not shown).

Therefore, the pressure sensitive element 40 is disposed so that the longitudinal direction (Z-axis direction) thereof, namely the arrangement direction of the first and second base portions 40a and 40b is coaxial to or parallel to the displacement direction (Z-axis direction) of the diaphragm 24, and the displacement direction thereof is used as the detection axis. Moreover, since the frame 34 to which the pressure sensitive element 40 is connected is fixed by the supporting portions 32, the pressure sensitive element 40 will not be bent in directions other than the detection axis direction even when it receives a force generated by the displacement of the diaphragm 24. Therefore, it is possible to prevent the pressure sensitive element 40 from moving in directions other than the detection axis direction and to suppress a decrease in the sensitivity in the detection axis direction of the pressure sensitive element 40.

The pressure sensitive element 40 is electrically connected to the IC (not shown) through the hermetic terminals 26 and the wires 28 and vibrates at a natural resonance frequency in response to an alternating voltage supplied from the IC (not shown). Moreover, the resonance frequency of the pressure sensitive element 40 changes when it receives extensional stress or compressive stress from the longitudinal direction (Z-axis direction) thereof. In the present embodiment, a double-ended tuning fork vibrator can be used as the vibrating arms 40c serving as the pressure sensing portion. The double-ended tuning fork vibrator has characteristics such that the resonance frequency thereof changes substantially in proportion to tensile stress (extensional stress) or compressive stress which is applied to the two vibrating beams which are the vibrating arms 40c. Moreover, a double-ended tuning fork piezoelectric vibrator is ideal for a pressure sensor which has such an excellent resolution as to detect a small pressure difference since a change in the resonance frequency to extensional and compressive stress is very large as compared to a thickness shear vibrator or the like, and a variable width of the resonance frequency is great. In the double-ended tuning fork piezoelectric vibrator, the resonance frequency of the vibrating arm increases when it receives extensional stress, whereas the resonance frequency of the vibrating arm decreases when it receives compressive stress.

In the present embodiment, the pressure sensing portion is not limited to one which has two rod-like vibrating beams, but a pressure sensing portion having one vibrating beam (single beam) may be used. If the pressure sensing portion (the vibrating arms 40c) is configured as a single-beam vibrator, the displacement thereof is doubled when the same amount of stress is applied from the longitudinal direction (detection axis direction). Therefore, it is possible to obtain a pressure sensor which is more sensitive than one having a double-ended tuning fork vibrator. In addition, among the piezoelectric materials described above, a quartz crystal having an excellent temperature property is preferred as the material of a piezoelectric substrate of a double-ended or single-beam piezoelectric vibrator.

In the present embodiment, both ends in the longitudinal direction of the pressure sensitive element 40 are, as a result, connected to the side of the diaphragm 24. With this configuration, it is possible to suppress thermal deformation transmitted to the pressure sensitive element 40 caused by expansion and contraction due to a change in overall temperature of the housing 12 (container). Furthermore, since the pressure sensitive element 40 and the frame 34 are formed of the same material, they have the same proportion of the amounts of expansion and contraction in the detection axis direction due to a change in temperature. Accordingly, in response to expansion and contraction in the detection axis direction due to a change in temperature, the pressure sensitive element 40 receives small thermal deformation from the frame 34.

In the present embodiment, although the pressure sensitive element 40 and the frame 34 are formed integrally, it is preferable to form the pressure sensitive element 40 and the frame 34 so that an end portion 40d of the first base portion 40a of the pressure sensitive element 40 connected to the central portion 24a of the diaphragm 24 and an end portion 36c of the first fixing portion 36a of the shock absorbing portion 36 connected to the peripheral portion 24c are arranged on the same straight line.

In the present embodiment, if these portions are not arranged on the same straight line, the shock absorbing portions 36 and the pressure sensitive element 40 have different lengths in the longitudinal direction. When the pressure sensitive element 40 and the shock absorbing portions 36 are moved to come into contact with the diaphragm 24 in a state where the detection axis of the pressure sensitive element 40 faces the Z-axis, the longer one comes into contact with the diaphragm 24 and the others are floated from the diaphragm 24. On the other hand, although the pressure sensitive element 40 and the frame 34 expand and contract due to a change in temperature, the amount of expansion and contraction changes in a predetermined proportion to the temperature change regardless of the material dimensions. Thus, the dimensions of the floated portions are also changed when the pressure sensitive element 40 and the frame 34 are not fixed to the supporting portions 30 and 32. Here, for the sake of simplicity, assuming that the supporting portion 30 and the supporting portions 32 are not expanded or contracted due to a change in temperature, since the pressure sensitive element 40 and the frame 34 are connected to the supporting portion 30 and the supporting portions 32, respectively, when the temperature is changed, the pressure sensitive element 40 and the frame 34 receive thermal deformation for maintaining the dimensions of the floated portions. As a result, the pressure sensitive element 40 receives thermal deformation from the frame 34. Therefore, by forming the end portion 40d and the end portion 36c on the same straight line, it is possible to suppress thermal deformation between the frame 34 and the pressure sensitive element 40. Moreover, since the frame 34 and the pressure sensitive element 40 are formed integrally, it is possible to decrease the number of components and to realize cost reduction.

On the other hand, in the present embodiment, since the thermal expansion coefficients of the diaphragm 24 (stainless steel) and the frame 34 (quartz crystal) are different, the frame 34 receives thermal deformation from the diaphragm 24, in a direction (X-axis direction) vertical to the detection axis of the pressure sensitive element 40, namely the displacement direction (Z-axis direction) of the diaphragm 24. As a result, the pressure sensitive element 40 receives thermal deformation from the frame 34, which becomes the cause of pressure measurement errors.

The present inventor has studied the conditions where the thermal deformation of the pressure sensitive element 40 decreases. The present inventor has found that the thermal deformation applied to the pressure sensitive element 40 can be decreased by causing the shock absorbing portion 36 to be bent more (absorb thermal deformation more). Therefore, in the frame 34 which is integrated with the pressure sensitive element 40, the amounts of the expansion and contraction of the shock absorbing portion 36, the beam portion 38, and the pressure sensitive element 40 will be considered. Here, since no force is transmitted to the pressure sensitive element 40 if the bending of the beam portion 38 is large, the conditions of the beam portion 38 for transmitting a force to the pressure sensitive element 40 will be discussed before discussing the effect of thermal deformation on the pressure sensitive element 40. The conditions are synonymous to the conditions for giving predetermined pressure sensitivity to the pressure sensitive element 40. First, the bending of the beam portion 38 when both ends in the longitudinal direction (X-axis direction) of the beam portion 38 are fixed, and a force F is applied to the center of the beam portion 38 in the longitudinal direction from the +Z-axis direction (see FIGS. 1, 2A, and 2B) will be considered. If the length in the longitudinal direction of the beam portion 38 is $L_C$, the Young's modulus of the beam portion 38 is $E_C$, the height (Z-axis direction) of the beam portion 38 is $H_C$, and the width (thickness in the Y-axis direction) of the beam portion 38 is $W_C$, the amount $\delta_C$ of expansion and contraction of the beam portion 38 can be expressed as Expression (1) below from the theorem of elastic body dynamics.

$$\delta_C = \frac{FL_C^3}{4E_c H_C^3 W_C} \qquad (1)$$

Next, the expansion and contraction of the pressure sensitive element 40 will be considered. In the pressure sensitive element 40 in which the first base portion 40a is fixed to the supporting portion 30, if the length of the pressure sensitive element 40 is $L_A$, the Young's modulus of the pressure sensitive element 40 is $E_A$, and the cross-sectional area (average value) of the pressure sensitive element 40 is $S_A$, the amount $\delta_A$ of expansion and contraction of the pressure sensitive element 40 in response to the force F from the beam portion 38 of which both ends are fixed can be expressed as Expression (2) below from the theorem of elastic body dynamics.

$$\delta_A = \frac{FL_A}{E_A S_A} \qquad (2)$$

Here, the dominant parameter of the pressure sensitivity of the pressure sensitive element 40 is the proportion γ between the amount $\delta_C$ of expansion and contraction of the beam portion 38 and the amount $\delta_A$ of expansion and contraction of the pressure sensitive element 40, which can be expressed as Expression (3) below.

$$\gamma_C = \frac{\delta_C}{\delta_A} = \frac{E_A L_C^3 S_A}{4 E_C L_A H_C^3 W_C} \tag{3}$$

Figure 3:
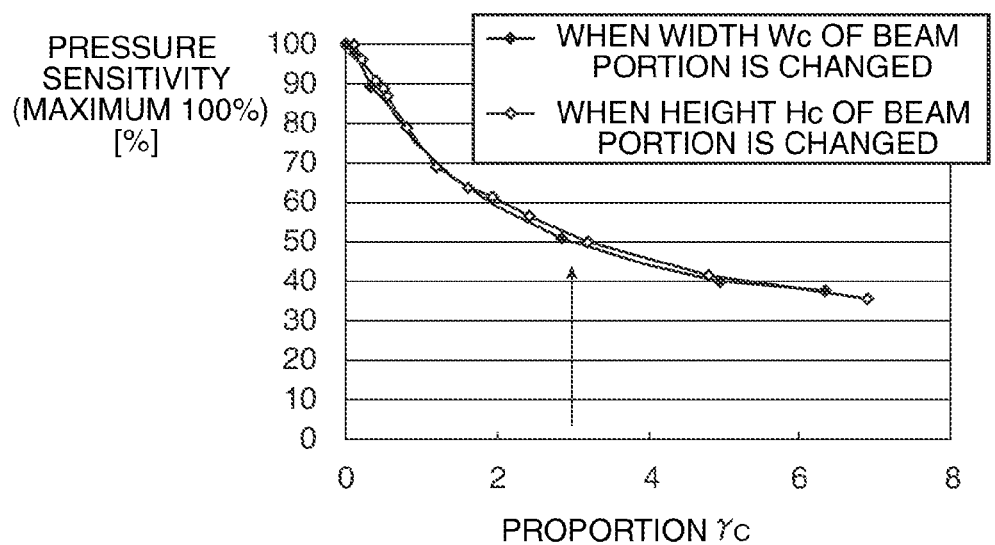
FIG. 3 is a graph showing the relationship between pressure sensitivity of a pressure sensitive element and a proportion $\gamma_C$ when the cross-sectional dimensions of a beam portion are changed.

FIG. 3 shows a graph of the relationship between the pressure sensitivity of the pressure sensitive element and the proportion $\gamma_C$ when the cross-sectional dimensions of the beam portion are changed. The present inventor examined the change in the proportion $\gamma_C$ when the height $H_C$ and the width $W_C$ of the beam portion 38 were changed as shown in FIG. 3. Moreover, the change in pressure sensitivity can be calculated based on the amount of change in the resonance frequency of the pressure sensitive element 40 when predetermined pressure is applied to the diaphragm 24.

In FIG. 3, if the width $W_C$ of the beam portion 38 is increased, since the rigidity of the beam portion 38 increases, the proportion $\gamma_C$ decreases and the pressure sensitivity increases. In contrast, if the width $W_C$ is decreased, since the rigidity decreases, the proportion $\gamma_C$ increases and the pressure sensitivity decreases. Moreover, if the height $H_C$ of the beam portion 38 is increased, since the rigidity of the beam portion 38 increases, the proportion $\gamma_C$ decreases, and the pressure sensitivity increases. In contrast, if the height $H_C$ is decreased, since the rigidity of the beam portion 38 decreases, the pressure sensitivity decreases. Moreover, it can be understood that similar curves are obtained when the width $H_C$ is changed and when the height $H_C$ is changed. Furthermore, it can be understood that the sensitivity increases abruptly when the proportion $\gamma_C$ is 3 or less. Therefore, it is necessary to design the dimensions of the beam portion 38 and the pressure sensitive element 40 so as to satisfy the relation of Expression (4) below.

$$\gamma_C = \frac{\delta_C}{\delta_A} = \frac{E_A L_C^3 S_A}{4 E_C L_A H_C^3 W_C} \leq 3 \tag{4}$$

Next, the expansion and contraction of the shock absorbing portion 36 will be considered. In the shock absorbing portion 36 in which the first fixing portion 36a is fixed to the supporting portion 32, if the length in the longitudinal direction of the shock absorbing portion 36 is $L_B$, the Young's modulus of the shock absorbing portion 36 is $E_B$, and the cross-sectional area of the shock absorbing portion 36 is $S_B$, the amount $\delta_B$ of expansion and contraction of the shock absorbing portion 36 fixed to both ends in the longitudinal direction of the beam portion 38 when both ends in the longitudinal direction (X-axis direction) of the beam portion 38 are released from the fixed state, and a force is applied to both ends in the longitudinal direction from the +Z-axis direction can be expressed as Expression (5) below from the theorem of elastic body dynamics.

$$\delta_B = \frac{F L_B}{E_B S_B} \tag{5}$$

The dominant parameter of the thermal deformation is the proportion $\gamma_B$ between the amount $\delta_B$ of expansion and contraction of the shock absorbing portion 36 and the amount $\delta_A$ of expansion and contraction of the pressure sensitive element 40, which can be expressed as Expression (6) below.

$$\gamma_B = \frac{\delta_B}{\delta_A} = \frac{L_B E_A S_A}{L_A E_B S_B} \tag{6}$$

Figure 4:
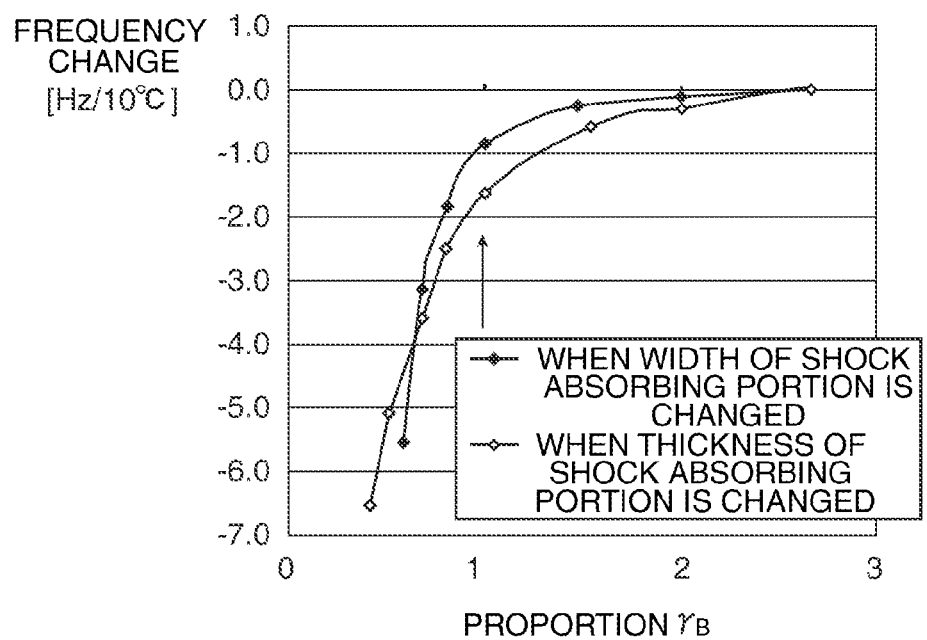
FIG. 4 is a graph showing the relationship between a bending proportion $\gamma_B$ and a frequency change due to thermal deformation when the cross-sectional dimensions of a shock absorbing portion are changed.

FIG. 4 shows a graph of the relationship between the proportion $\gamma_B$ and the change in frequency due to thermal deformation when the cross-sectional area of the shock absorbing portion is changed. The present inventor examined the change in the proportion $\gamma_B$ when the width and the thickness of the shock absorbing portion 36 were changed as shown in FIG. 4. In this examination, since compressive stress is applied to the pressure sensitive element 40, the compressive stress acts to decrease the resonance frequency.

In FIG. 4, if the width or the thickness of the shock absorbing portion 36 is increased, since the rigidity of the shock absorbing portion 36 increases, the proportion $\gamma_B$ decreases and the frequency decreases (the change in frequency increases). In contrast, if the width or the thickness is decreased, since the rigidity decreases, the proportion $\gamma_B$ increases and the frequency increases (the change in frequency decreases). Moreover, it can be understood that similar curves are obtained when the width is changed and when the thickness is changed. Furthermore, it can be understood that the change in frequency increases abruptly when the proportion $\gamma_B$ is 1 or less. Here, a large change in frequency means that the received thermal deformation is large. Therefore, it is necessary to design the cross-sectional dimensions (the width and thickness dimensions) of the shock absorbing portion 36 so that the proportion $\gamma_B$ of expansion and contraction satisfies the relation of Expression (7) below.

$$\gamma_B = \frac{\delta_B}{\delta_A} = \frac{L_B E_A S_A}{L_A E_B S_B} \geq 1 \tag{7}$$

Furthermore, in the present embodiment, the frame 34 and the pressure sensitive element 40 are integrally formed, and the lengths in the longitudinal direction of the shock absorbing portion 36 and the pressure sensitive element 40 are designed so as to be identical. Therefore, Expressions (4) and (7) can be expressed as Expressions (8) and (9) below, respectively.

$$\gamma_C = \frac{\delta_C}{\delta_A} = \frac{L_C^3 S_A}{4 L_A H_C^3 W_C} \leq 3 \tag{8}$$

$$\gamma_B = \frac{\delta_B}{\delta_A} = \frac{S_A}{S_B} \geq 1 \tag{9}$$

Therefore, according to Expression (9), in the present embodiment, it is necessary to design the cross-sectional area $S_B$ of the shock absorbing portion 36 so as to be smaller than the cross-sectional area $S_A$ of the pressure sensitive element 40. Furthermore, since the thicknesses (in the Y-axis direction) of both are identical, as a result, it is necessary to design the width (in the X-axis direction) of the shock absorbing portion 36 so as to be smaller than the width (in the X-axis direction) of the pressure sensitive element 40.

Figure 5A:
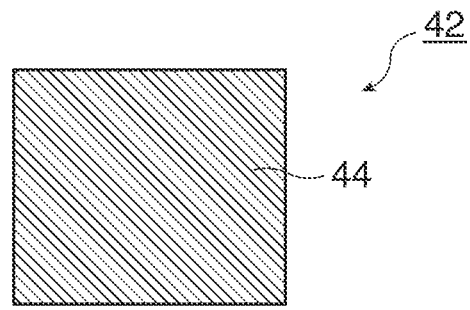
FIGS. 5A to 5E are schematic views when a frame (the shock absorbing portion and the beam portion) and the pressure sensitive element are integrally formed of quartz crystal.
Figure 5B:
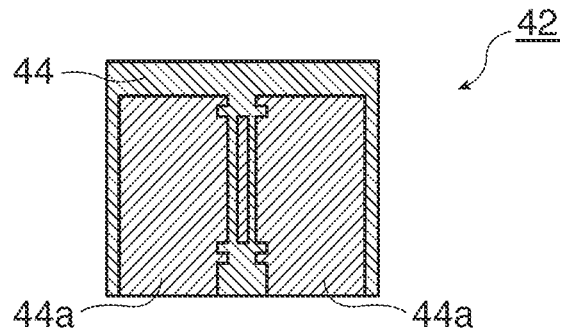
Figure 5C:
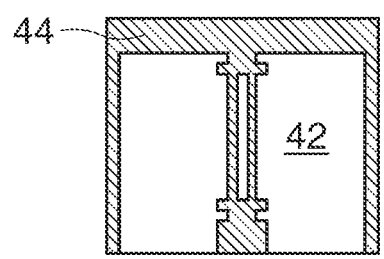
Figure 5D:
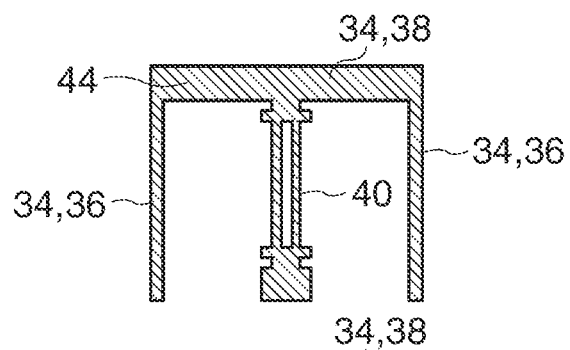
Figure 5E:
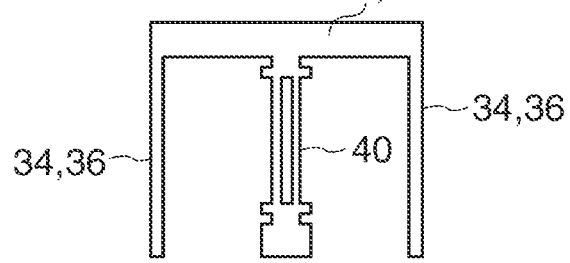

FIGS. 5A to 5E show schematic views when the frame (the shock absorbing portion and the beam portion) and the pressure sensitive element are integrally formed of quartz crystal. When the frame and the pressure sensitive element are integrally formed of quartz crystal, as described above, it is preferable to form them by photolithographic etching. First, a base substrate 42 serving as a material is prepared, and a positive photoresist 44 is applied on the surface of the base substrate 42 (FIG. 5A). Subsequently, exposure is preformed using a photomask corresponding to the integrated shape of the shock absorbing portion 36, the beam portion 38, and the pressure sensitive element 40 so as to expose the photoresist 44 (FIG. 5B). Subsequently, development is performed so as to remove the exposed photoresist 44a (FIG. 5C). Subsequently, a region on which the base substrate 42 is exposed is subjected to etching, whereby the shock absorbing portion 36, the beam portion 38, and the pressure sensitive element 40 are integrally formed (FIG. 5D). Finally, the photoresist 44 is removed (FIG. 5E), whereby the integrated member (the frame and the pressure sensitive element) is formed.

The pressure sensor 10 of the first embodiment is assembled in the following manner. First, the diaphragm 24 is connected to the ring portion 16, and the supporting portions 30 and 32 are connected to predetermined positions of the diaphragm 24. Moreover, the first base portion 40a of the pressure sensitive element 40 is connected to the side surface of the supporting portion 30, and the first fixing portion 36a of the shock absorbing portion 36 is connected to the supporting portion 32.

Subsequently, the supporting shaft 18 is fixed by inserting it into the hole 16a of the ring portion 16, and the other end of the supporting shaft 18 of which one end has been inserted into the ring portion 16 is fixed by inserting it into the hole 14c of the flange portion 14 in advance. Moreover, the portions of the hermetic terminals 26 disposed inside the housing 12 are electrically connected to the electrode portions (not shown) of the pressure sensitive element 40 by the wires 28. In this case, the portions of the hermetic terminals 26 disposed outside the housing 12 are connected to the IC (not shown). Finally, the side surfaces (side walls) 20 are inserted from the side of the ring portion 16 so as to be bonded to the outer periphery 14d of the flange portion 14 and the outer periphery 16b of the ring portion 16. In this way, the housing 12 is formed, and the pressure sensor 10 is assembled. When the pressure sensor 10 is used as a pressure sensor that measures absolute pressure with reference to a vacuum, the pressure sensor 10 may be assembled in a vacuum without forming the air inlet opening 14e.

Next, the operation of the pressure sensor 10 according to the first embodiment will be described. In the first embodiment, when measuring fluid pressure with reference to atmospheric pressure, the central portion 24a of the diaphragm 24 is displaced toward the inner side of the housing 12 if the fluid pressure is lower than atmospheric pressure. In contrast, the central portion 24a is displaced toward the outer side of the housing 12 if the fluid pressure is higher than atmospheric pressure.

Moreover, when the central portion 24a of the diaphragm 24 is displaced toward the outer side of the housing 12, the pressure sensitive element 40 receives tensile stress from the central portion 24a and the shock absorbing portion 36 that is supported by the peripheral portion 24c (the fixing portion). In contrast, when the central portion 24a is displaced toward the inner side of the housing 12, the pressure sensitive element 40 receives compressive stress from the central portion 24a and the shock absorbing portion 36.

Furthermore, when there is a change in temperature of the pressure sensor 10, the housing 12, the diaphragm 24, the frame 34, the pressure sensitive element 40, and the like constituting the pressure sensor 10 will be expanded and contracted in accordance with their thermal expansion coefficient. However, as described above, since both ends in the detection axis direction of the pressure sensitive element 40 are connected to the side of the diaphragm 24, the thermal deformation resulting from the expansion and contraction in the Z-axis direction of the housing 12 is suppressed. Moreover, when the frame 34 and the diaphragm 24 are expanded and contracted in a direction (X-axis direction) vertical to the detection axis due to a change in temperature resulting from a difference in the thermal expansion coefficients thereof, the frame 34 receives thermal deformation from the diaphragm 24. Thus, the pressure sensitive element 40 receives thermal deformation from the frame 34. However, when the shock absorbing portion 36 constituting the frame 34 is designed so as to satisfy the relations of Expressions (7) and (9), since the shock absorbing portion 36 absorbs most of the thermal deformation received from the diaphragm 24, the pressure sensor 10 is capable of decreasing the amount of thermal deformation applied to the pressure sensitive element 40 to thereby decrease the error in the pressure values due to a change in temperature.

Second Embodiment

Figure 6:
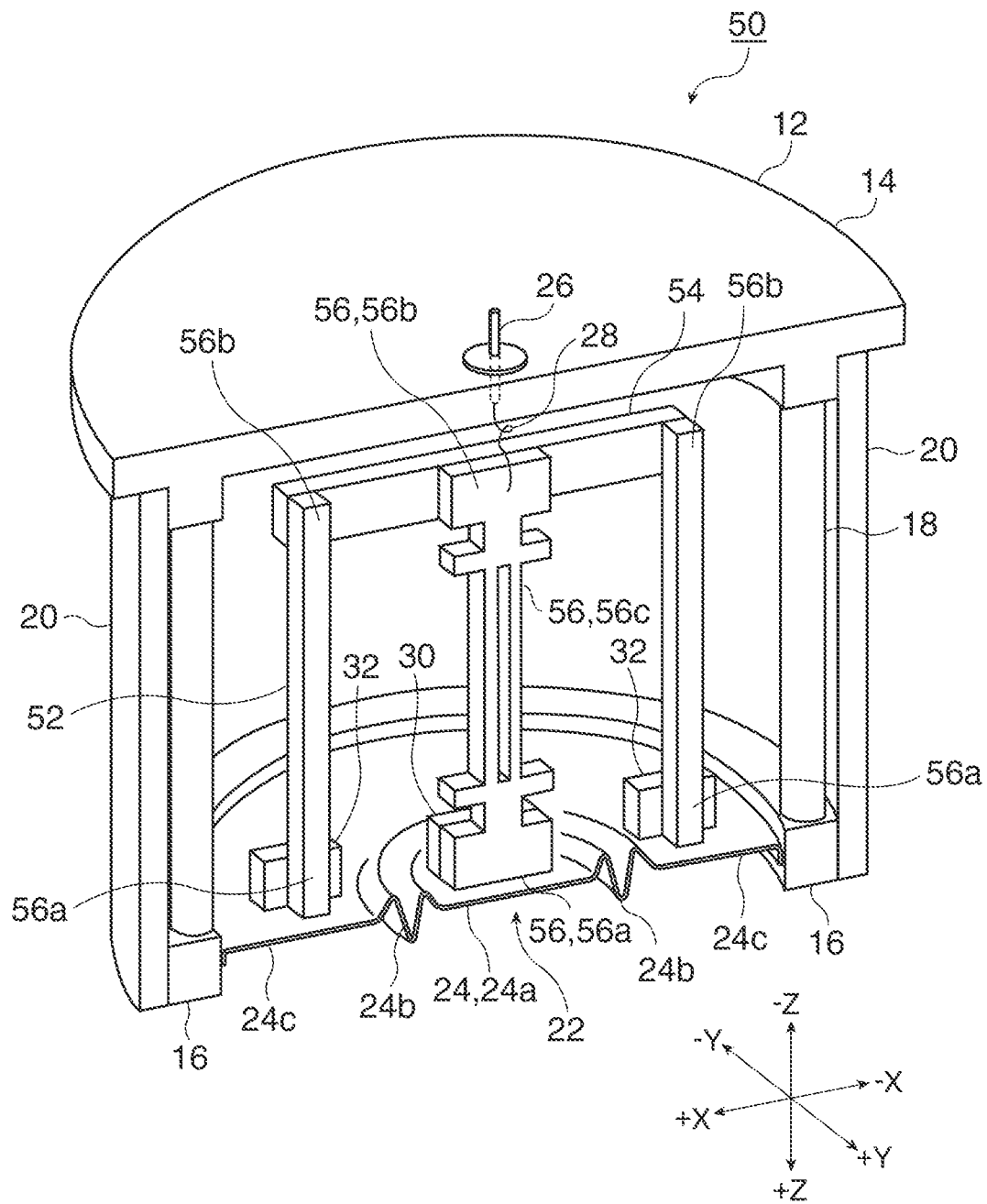
FIG. 6 is a perspective cross-sectional view of a pressure sensor according to a second embodiment, taken along the XZ plane.
Figure 7A:
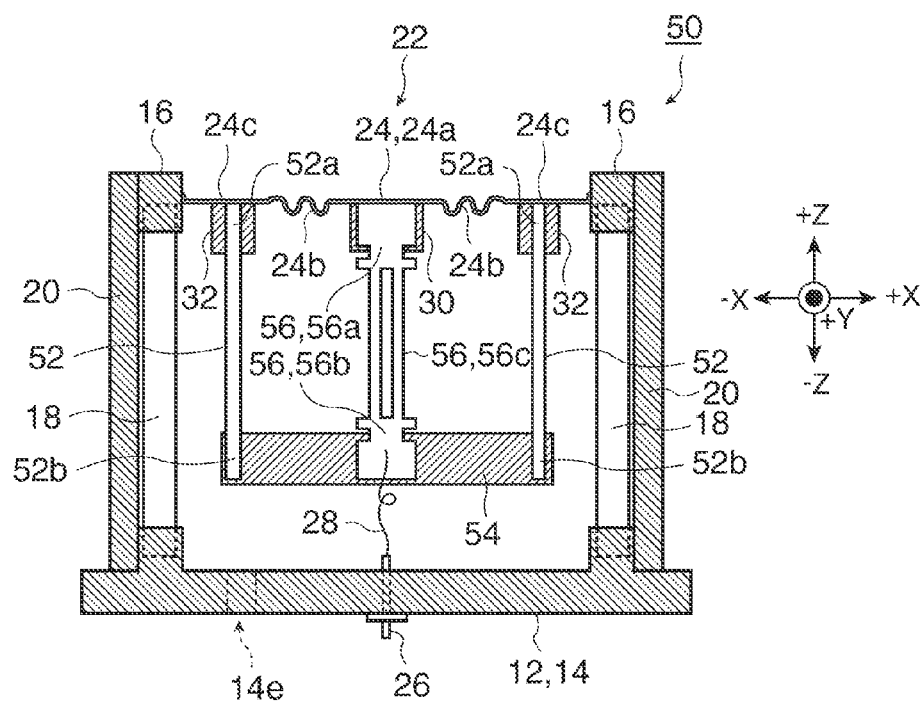
FIGS. 7A and 7B are cross-sectional views of the pressure sensor according to the second embodiment, taken along the XZ and YZ planes, respectively.
Figure 7B:
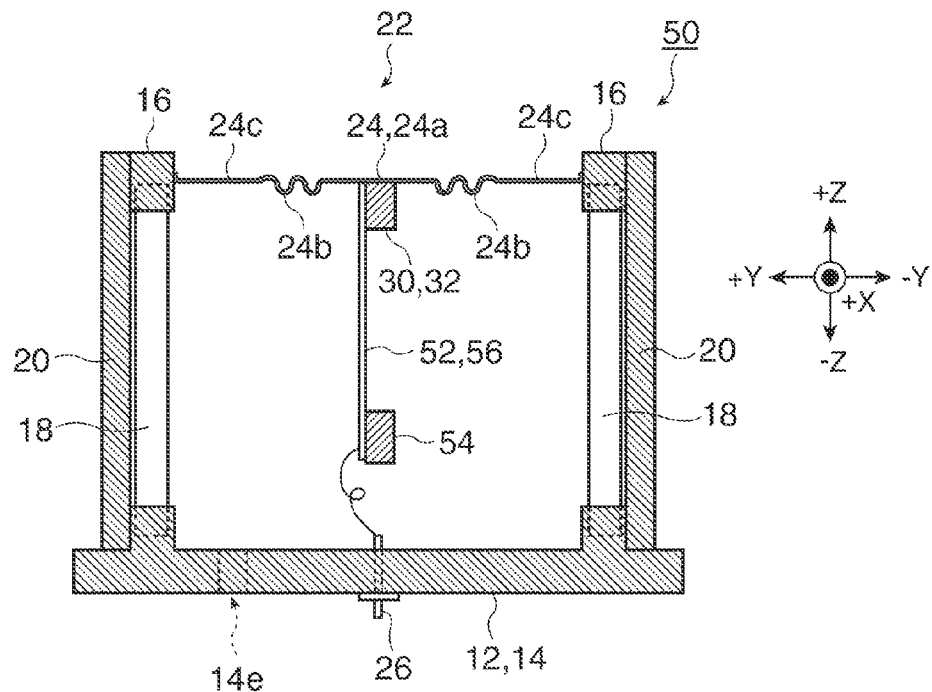

A pressure sensor according to a second embodiment is shown in FIGS. 6, 7A, and 7B. FIG. 6 is a perspective cross-sectional view of the pressure sensor according to the second embodiment, taken along the XZ plane. FIGS. 7A and 7B are cross-sectional views of the pressure sensor according to the second embodiment, taken along the XZ and YZ planes, respectively.

A pressure sensor 50 according to the second embodiment is basically similar to that of the first embodiment, but is different in that the frame (a shock absorbing portion 52 and a beam portion 54) and a pressure sensitive element 56 are separately formed and are connected by an adhesive agent or the like. In the following description, the same constituent elements as those of the first embodiment will be denoted by the same reference numerals, and detailed description thereof will be omitted unless necessary.

In the second embodiment, the beam portion 54 is formed of a material having the same thermal expansion coefficient as the diaphragm 24 which is the pressure receiving member or is formed of the same material (stainless steel) as the diaphragm 24. With this configuration, the diaphragm 24 and the beam portion 54 have the same proportion of the amounts of expansion and contraction in the direction (X-axis direction) vertical to the detection axis (Z-axis direction) of the pressure sensitive element 56. Therefore, it is possible to suppress the frame from receiving the thermal deformation from the diaphragm 24, and accordingly, to suppress the thermal deformation applied to the pressure sensitive element 56 from the frame.

Moreover, in the present embodiment, the shock absorbing portion 52 and the pressure sensitive element 56 are formed of the same material and are designed so that the lengths in the longitudinal direction (Z-axis direction) thereof are the same. In the present embodiment, when a double-ended tuning fork piezoelectric vibrator is used as the pressure sensitive element 56, although a Z-cut quartz crystal substrate is used as a raw material, since quartz crystal has an anisotropic property, the thermal expansion coefficient or the Young's modulus is different depending on a crystal orientation. Therefore, the pressure sensitive element 56 is formed so that the plane orientation in the longitudinal direction (Z-axis direction) of the shock absorbing portion 52 is parallel to the plane orientation in the longitudinal direction (Z-axis direction) of the pressure sensitive element 56. Alternatively, it is necessary to form the pressure sensitive element 56 so that the angle of a crystal orientation in the longitudinal direction falls within 3°. Moreover, first fixing portions 52a of the shock absorbing portion 52 are connected to the supporting portions 32, and the second fixing portions 52b are connected to the beam portion 54. On the other hand, a first base portion 56a of the pressure sensitive element 56 is fixed to the supporting portion 30, and the second base portion 56b is connected to the central portion in the longitudinal direction of the beam portion 54.

Figure 8:
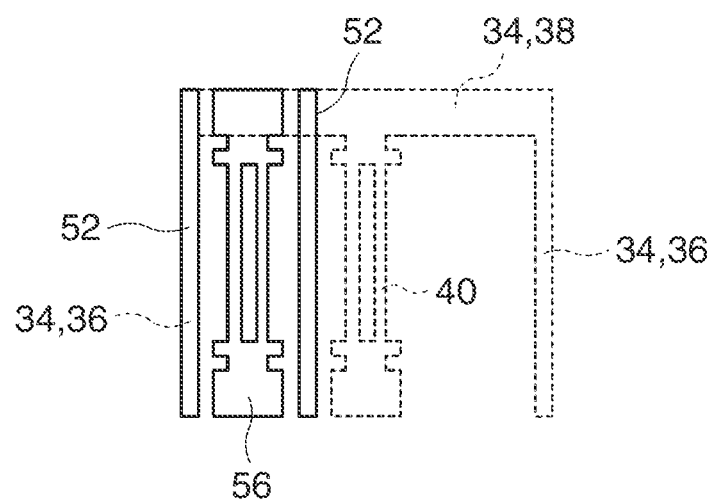
FIG. 8 is a schematic view showing a formation pattern of a shock absorbing portion and a pressure sensitive element according to the second embodiment.

FIG. 8 shows a formation pattern of the shock absorbing portion and the pressure sensitive element according to the second embodiment. As shown in FIG. 8, although the shock absorbing portion 52 and the pressure sensitive element 56 of the second embodiment are preferably formed by photolithographic etching similarly to the first embodiment, it is not necessary to form the frame from the beginning unlike the first embodiment. Therefore, as shown in FIG. 8, since the size of a region of the quartz crystal substrate which is melted by etching or the area occupied by the pair of shock absorbing portions 52 and the pressure sensitive element 56 used for one pressure sensor 50 can be decreased, it is possible to realize cost reduction.

Figure 9A:
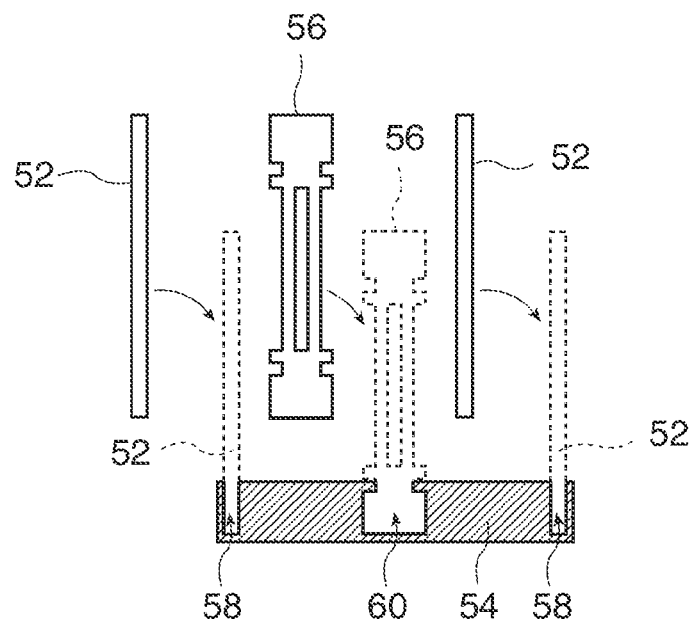
FIGS. 9A and 9B are schematic views showing a beam portion according to a modification of the second embodiment.
Figure 9B:
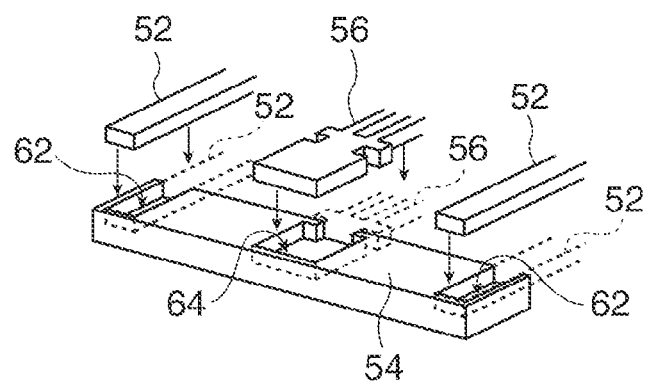

FIGS. 9A and 9B show a beam portion according to a modification of the second embodiment. FIG. 9A is a detailed view when forming slits, and FIG. 9B is a detailed view when forming recesses. In FIGS. 6, 7A, and 7B, the shock absorbing portion 52 and the pressure sensitive element 56 are bonded to the beam portion 54 using an adhesive agent or the like. As shown in FIGS. 9A and 9B, when the width (thickness) of the beam portion 54 is larger than the thickness of the shock absorbing portion 52 or the pressure sensitive element 56, it is preferable to form slits or recesses having the same shape as the second fixing portion 52b of the shock absorbing portion 52 and the second base portion 56b of the pressure sensitive element 56. For example, if the beam portion 54 has approximately the same thickness as the shock absorbing portion 52 and the pressure sensitive element 56, it is preferable to form slits 58 and 60 as shown in FIG. 9A, insert the second fixing portion 52b of the shock absorbing portion 52 into the slit 58, insert the second base portion 56b of the pressure sensitive element 56 into the slit 60 and then attach and fix them together. Moreover, if the beam portion 54 has a larger thickness than the shock absorbing portion 52 and the pressure sensitive element 56, as shown in FIG. 9B, it is preferable to form recesses 62 and 64 in the beam portion 54 so as to have the same depth as the thickness of the shock absorbing portion 52 and the pressure sensitive element 56 and insert the second fixing portion 52b of the shock absorbing portion 52 into the recess 62 and insert the second base portion 56b of the pressure sensitive element 56 into the recess 64 and then attach and fix them together. In any of FIGS. 9A and 9B, since the attachment positions of the shock absorbing portion 52 and the pressure sensitive element 56 with respect to the beam portion 54 are fixed, alignment during an attachment operation is made easy. Moreover, since the recesses can increase the contact area, it is possible to increase a bonding strength. In addition, the slits 58 and 60 and the recesses 62 and 64 can be formed by etching.

Third Embodiment

Figure 10A:
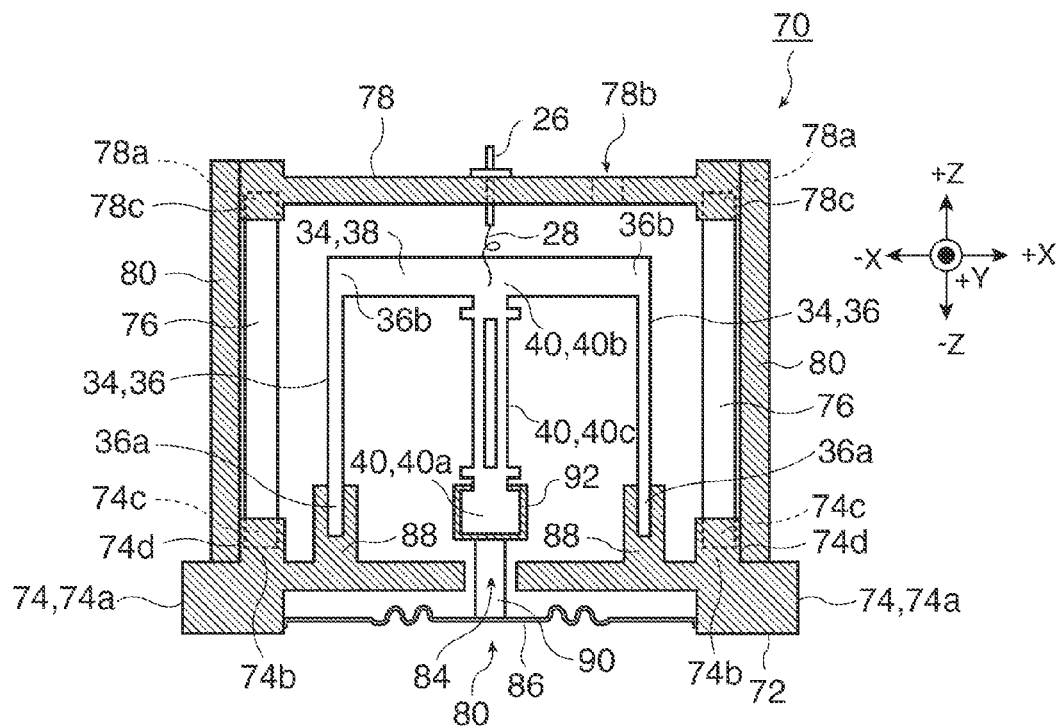
FIGS. 10A and 10B are cross-sectional views of the pressure sensor according to a third embodiment, taken along the XZ and YZ planes, respectively.
Figure 10B:
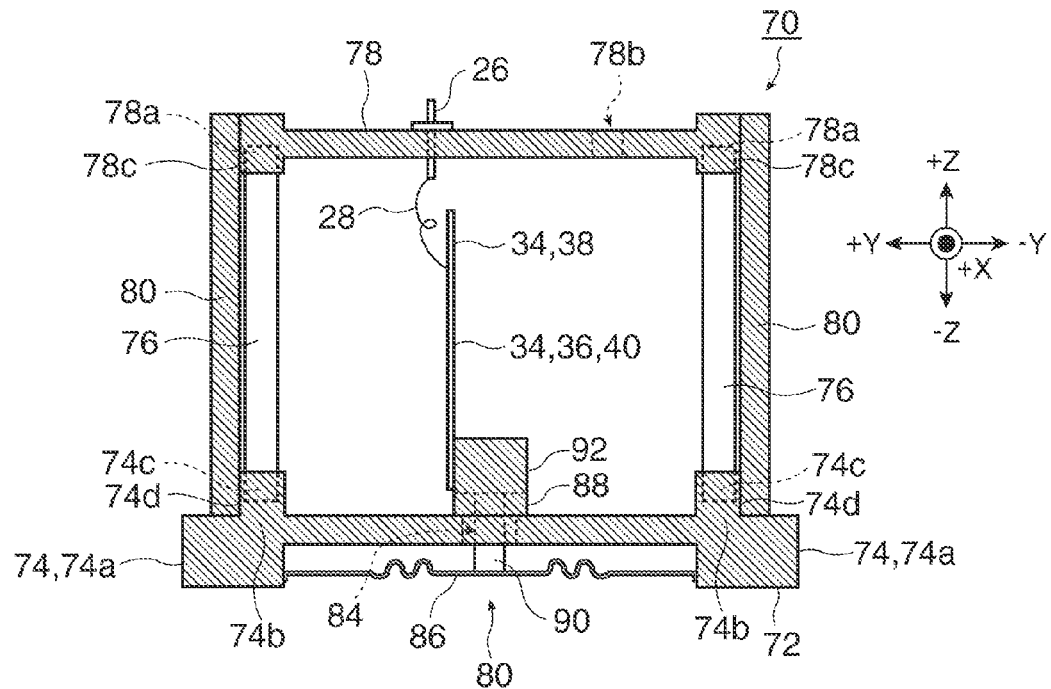

FIGS. 10A and 10B show cross-sectional views of a pressure sensor according to a third embodiment, taken along the XZ and YZ planes, respectively. The pressure sensor 70 according to the third embodiment is basically similar to that of the first and second embodiments but is different in that the shock absorbing portion 36 is connected to the side of a diaphragm 86 of a housing 72. Although the present embodiment will be described by way of the frame 34 and the pressure sensitive element 40 used in the first embodiment, the present embodiment can be applied to the shock absorbing portion 52, the beam portion 54, and the pressure sensitive element 56 of the second embodiment. Moreover, the present embodiment is used when the rigidity of the peripheral portion of the diaphragm 24 of the first embodiment is not sufficient for pressure from the outside. That is, in the present embodiment, since the shock absorbing portion 36 (52) is connected to a housing having high rigidity as described later, it is possible to increase the pressure sensitivity of the pressure sensitive element 40 (56).

The housing 72 includes a circular flange portion 74, supporting shafts 76, a circular top plate portion 78, and cylindrical side surfaces 80. The flange portion 74 includes an outer peripheral portion 74a that is connected to end portions of the side surfaces 80 and an inner peripheral portion 74b that is formed on the outer peripheral portion 74a to be concentric to the outer peripheral portion 74a, has the same diameter as the top plate portion 78, and is connected to the inner side surfaces of the side surfaces 80. Furthermore, the flange portion 74 includes an opening 82 that is concentric to the outer shape of the flange portion 74 and a penetration hole 84 which is formed at the center of the opening 82 so as to penetrate through the opening 82 and through which a center shaft 90 passes. Moreover, a diaphragm 86 is connected to the opening 82 so as to seal the opening 82. The diaphragm 86 is attached to the opening 82, whereby the diaphragm 86 forms a part of the outer wall of the housing 72.

Holes 74c and 78a in which supporting shafts 76 are inserted are formed at predetermined positions of the mutually facing surfaces of the inner peripheral portion 74b of the flange portion 74 and the top plate portion 78. Moreover, the holes 74c and 78a are formed at the mutually facing positions. Therefore, when the supporting shafts 76 are inserted into the holes 74c and 78a, the flange portion 74 and the top plate portion 78 are connected by the supporting shafts 76. The supporting shafts 76 are rod-like members having predetermined rigidity. The supporting shafts 76 are disposed inside the housing 74, one set of ends of the supporting shafts 76 is inserted into the holes 74c of the inner peripheral portion 74b, and the other set of ends thereof is inserted into the holes 78a of the top plate portion 78. In this way, predetermined rigidity is obtained between the flange portion 74, the supporting shafts 76, and the top plate portion 78. Although a plurality of supporting shafts 76 is used, the arrangement thereof is optional depending on the design of the positions of the respective holes. Moreover, supporting portions 88 for attaching the shock absorbing portions 36 thereto are attached to the inner peripheral portion 74b, and the first fixing portions 36a of the shock absorbing portions 36 are adhesively attached and fixed to the side surfaces of the supporting portions 88.

Moreover, the hermetic terminals 26 are attached to the top plate portion 78, and the hermetic terminals 26 and the electrode portions (not shown) of the pressure sensitive element 40 are electrically connected through the wires 28. When the pressure sensor 70 is used as the fluid pressure sensor described above, an air inlet opening 78b is formed at any position such that it does not interfere with the hermetic terminals 26 of the top plate portion 78.

The side surfaces 80 are configured to seal the side surfaces of the housing 72 and are connected to the outer periphery 74d of the inner peripheral portion 74b and the outer periphery 78c of the top plate portion 78, and the end portions thereof are connected to the outer peripheral portion 74a. The flange portion 74, the top plate portion 78, and the side surfaces 80 are preferably formed of metal such as stainless steel, and the supporting shafts 76 and the center shaft 90 are preferably formed of a material such as ceramics having predetermined rigidity and a low thermal expansion coefficient.

One principal surface of the diaphragm 86 attached to the opening 82 facing the outer surface of the housing 72 is configured as a pressure receiving surface. The pressure receiving surface is configured to be bent and deformed in response to pressure of a pressure measurement environment (for example, liquid) to thereby transmit a compressive force or a tensile force to the pressure sensitive element 40. Moreover, the center shaft 90 is attached to the center of the diaphragm 86 at the inside of the housing 72 so that the longitudinal direction of the center shaft 90 is coaxial to the displacement direction (Z-axis direction) of the diaphragm 86. With this configuration, the center shaft 90 moves in parallel to the longitudinal direction thereof when the diaphragm 86 receives pressure.

Moreover, a rectangular supporting portion 92 supporting one end (first base portion 40a) of the pressure sensitive element 40 is attached to the distal end of the center shaft 90, and the first base portion 40a is adhesively attached and fixed to the side surfaces of the supporting portion 92. The side surfaces of the supporting portion 92 and the side surfaces of the supporting portions 88 provided on the inner peripheral portion 74b are disposed so as to form the same plane. With this configuration, deformation associated with mounting is suppressed in the frame 34 which is integrated with the pressure sensitive element 40. Thus, it is possible to suppress deformation resulting from mounting applied to the pressure sensitive element 40 and to suppress errors in pressure values. The supporting portions 88 and the supporting portion 92 are preferably formed of the same material as the flange portion 74.

The pressure sensor 70 according to the third embodiment is assembled in the following manner. The diaphragm 86 is connected to the opening 82 in a state where the diaphragm 86 is attached to the center shaft 90, and the center shaft 90 is inserted into the penetration hole 84. Subsequently, the supporting portion 92 is attached to the distal end of the center shaft 90, and the supporting portions 88 are connected to predetermined positions of the inner peripheral portion 74b.

Subsequently, the supporting shaft 76 is fixed by inserting it into the hole 74c of the inner peripheral portion 74b, and the other end of the supporting shaft 76 of which one end has been inserted into the inner peripheral portion 74b in advance is fixed by inserting it into the hole 78a of the top plate portion 78. Moreover, the portions of the hermetic terminals 26 disposed inside the housing 72 are electrically connected to the electrode portions (not shown) of the pressure sensitive element 40 by the wires 28. In this case, the portions of the hermetic terminals 26 disposed outside the housing 72 are connected to the IC (not shown).

Finally, the side surfaces 80 are inserted from the side of the top plate portion 78 so as to be bonded to the outer periphery 78c of the top plate portion 78, the outer periphery 74d of the inner peripheral portion 74b, and the outer peripheral portion 74a. In this way, the housing 72 is formed, and the pressure sensor 70 is assembled.

In the third embodiment, the shock absorbing portions 36 constituting the frame 34 are fixed to the side surfaces of the supporting portions 88, and the first base portion 40a of the pressure sensitive element 40 is fixed to the side surfaces of the supporting portion 92. With this configuration, when the pressure applied to the pressure receiving surface of the diaphragm 86 is higher than the pressure inside the housing 72, the diaphragm 86 is displaced toward the inner side (+Z-axis side) of the housing 72, and compressive stress is applied to the pressure sensitive element 40. In contrast, when the pressure applied to the pressure receiving surface of the diaphragm 86 is lower than the pressure inside the housing 72, the diaphragm 86 is displaced toward the outer side (−Z-axis side) of the housing 72, and extensional stress is applied to the pressure sensitive element 40. Since the thermal deformation applied to the pressure sensitive element 40 is the same as that of the first embodiment, description thereof will be omitted.

Fourth Embodiment

Figure 11:
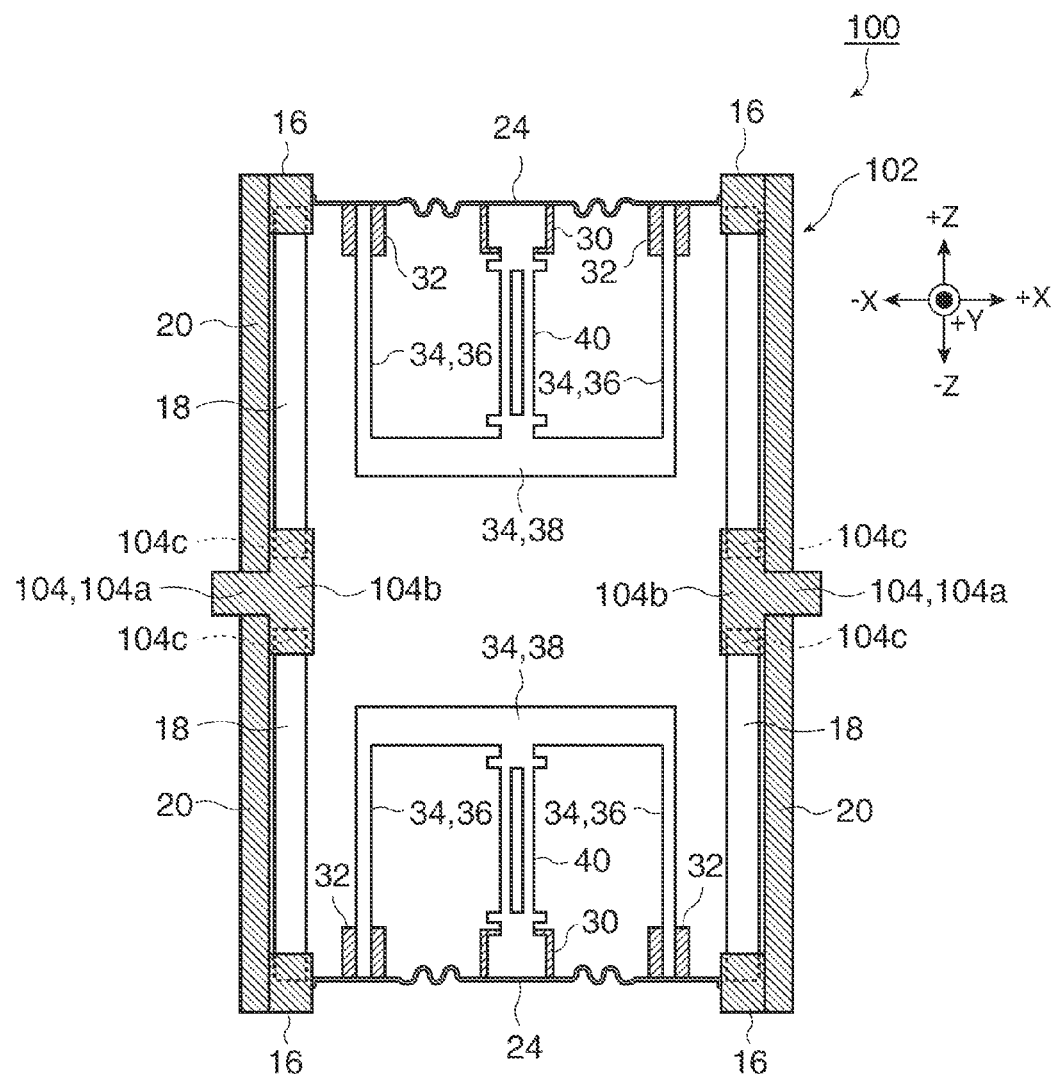
FIG. 11 is a schematic view of a pressure sensor according to a fourth embodiment.
Figure 12:
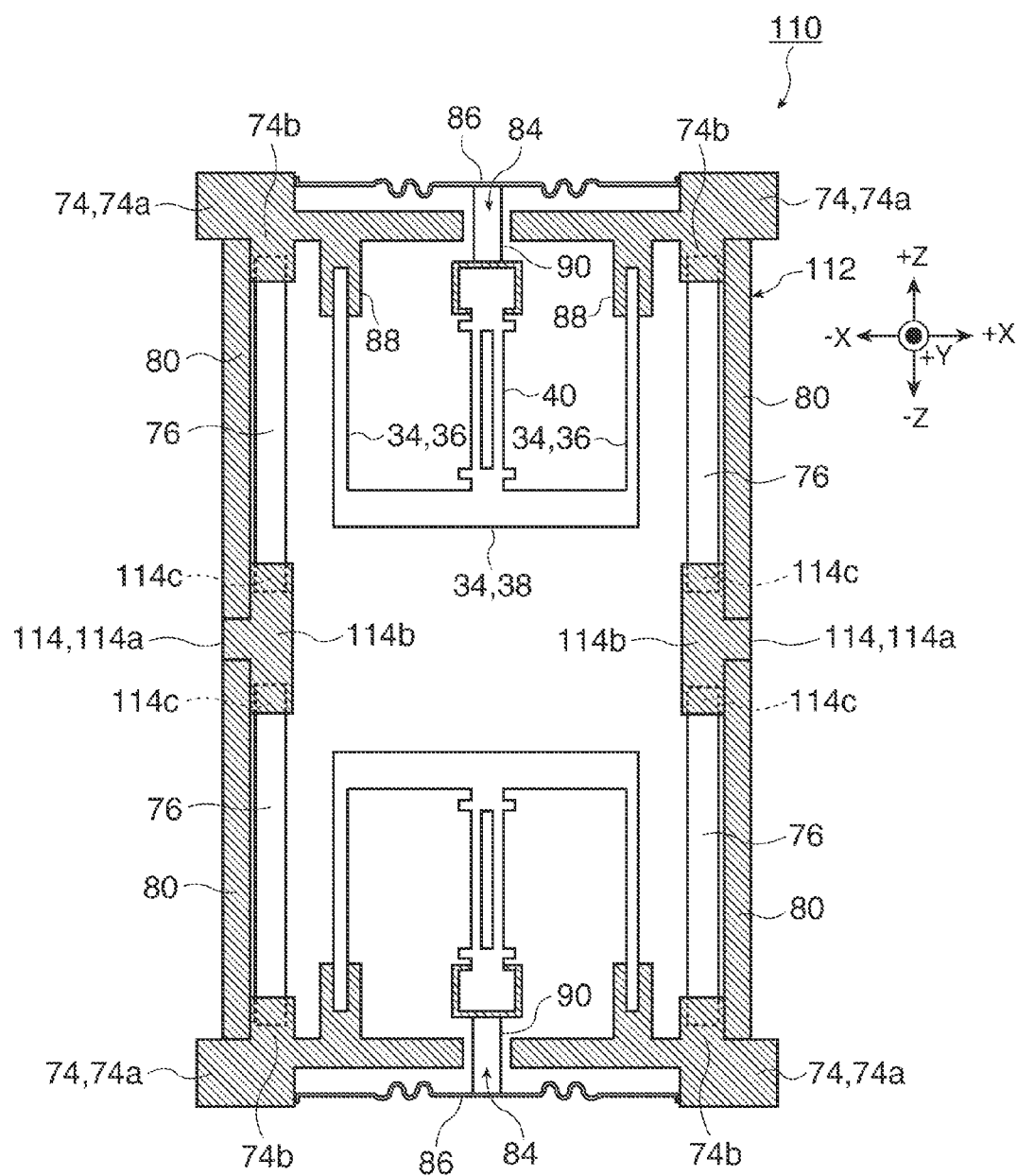
FIG. 12 is a schematic view of the pressure sensor according to the fourth embodiment.
Figure 13:
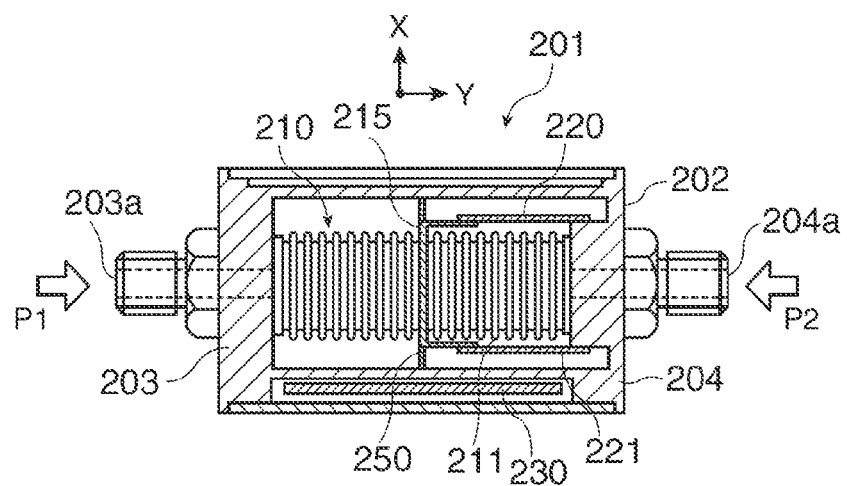
FIG. 13 is a schematic view of a pressure sensor disclosed in JP-A-2007-57395.
Figure 14:
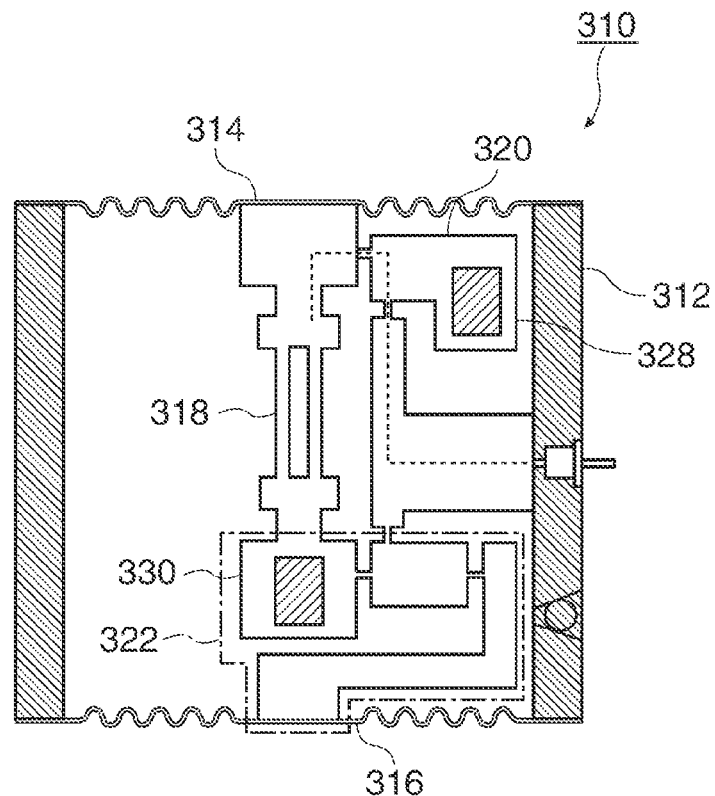
FIG. 14 is a schematic view of a pressure sensor disclosed in JP-A-2010-25582.
Figure 15:
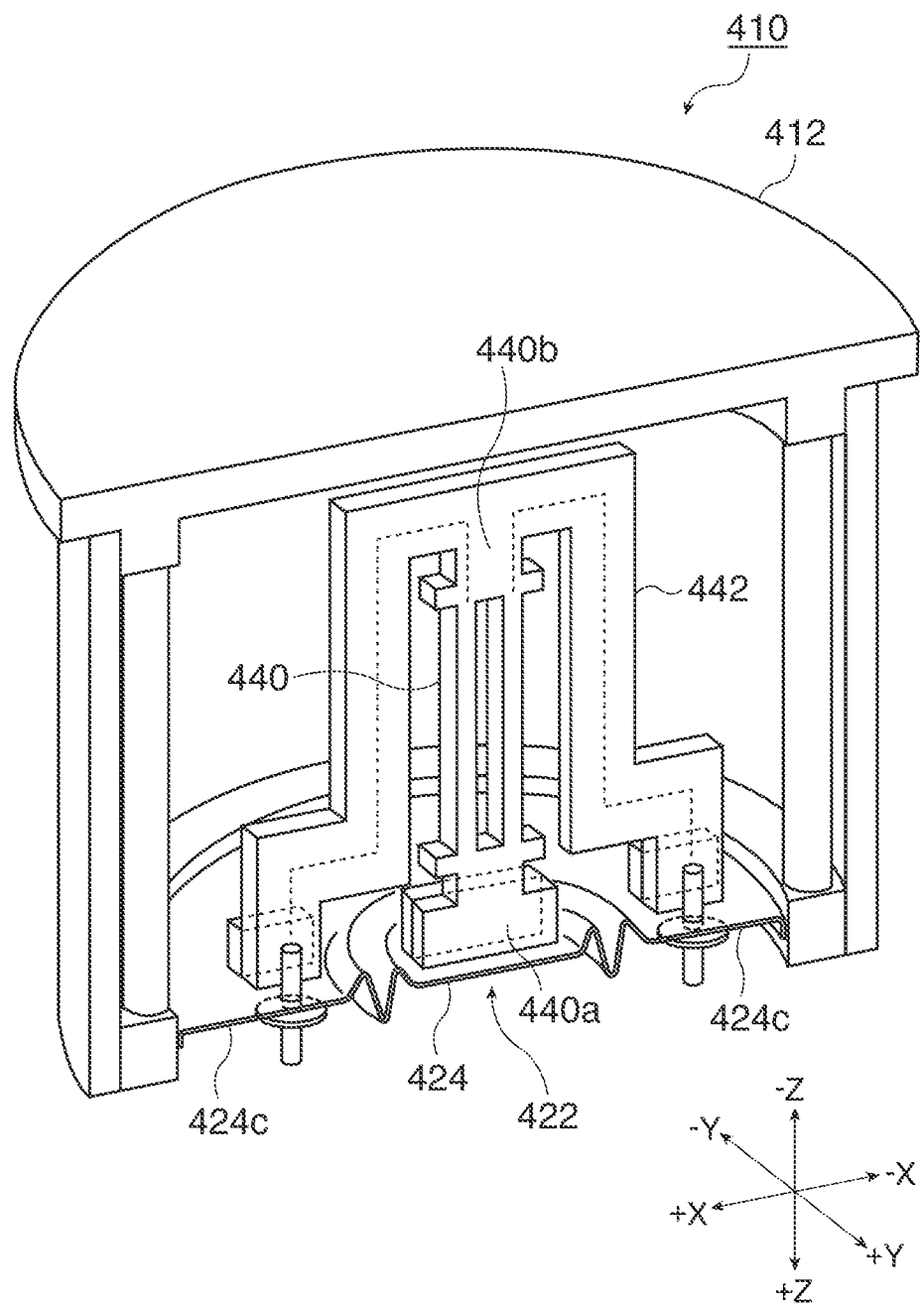
FIG. 15 is a schematic view of a pressure sensor disclosed in JP-A-2010-48798.

FIGS. 11 and 12 show a pressure sensor according to a fourth embodiment. FIG. 11 is a schematic view of the fourth embodiment based on the first embodiment, and FIG. 12 is a schematic view of the fourth embodiment based on the third embodiment. A pressure sensor according to the fourth embodiment has a configuration in which another set of the diaphragm, the pressure sensitive element, and the frame are arranged in a housing. The pressure sensor 100 shown in FIG. 11 uses two pressure sensors 10 of the first embodiment. That is, the pressure sensor 100 has a configuration in which two pressure sensors 10 without the flange portion 14 are bonded to each other using a flange portion 104 configured to be connected to both sides of the supporting shafts 18 that constitute two pressure sensors 10, whereby one housing 102 is formed. The flange portion 104 includes an outer peripheral portion 104a that is connected to the end portions of the side surfaces (side walls) 20 and an inner peripheral portion 104b that is formed on the inner side of the outer peripheral portion 104a to be concentric to the outer peripheral portion 104a, has the same diameter as the ring portion 16, and is connected to the inner side surfaces of the side surfaces (side walls) 20. Moreover, the flange portion 104 has holes 104c which are formed in the end portions in the Z-axis direction of the inner peripheral portion 104b so that the supporting shafts 18 are inserted therein.

In the pressure sensor 100 shown in FIG. 11, the upper and lower half parts of the pressure sensor 100 with the flange portion 104 disposed therebetween can be assembled independently. The upper and lower half parts are assembled similarly to the first embodiment. The hermetic terminals (not shown) may be attached to the peripheral portion 24c of the diaphragm 24 at positions where they do not interfere with the supporting portions 32. When the inside of the housing 102 is opened to the atmosphere, an air inlet opening (not shown) may be formed on the side surfaces (side walls) 20. Moreover, even when the pressure sensor 50 of the second embodiment is used, the same formation method can be used.

The pressure sensor 110 shown in FIG. 12 uses two pressure sensors 70 of the third embodiment. That is, the pressure sensor 110 has a configuration in which two pressure sensors 70 without the top plate portion 78 are bonded to each other using a flange portion 114 configured to be connected to both sides of the supporting shafts 76 that constitute two pressure sensors 70, whereby one housing 112 is formed. The flange portion 114 includes an outer peripheral portion 114a that is connected to the end portions of the side surfaces 80 and an inner peripheral portion 114b that is formed on the inner side of the outer peripheral portion 114a to be concentric to the outer peripheral portion 114a, has the same diameter as the inner peripheral portion (top plate portion 78) 74b, and is connected to the inner side surfaces of the side surfaces 80.

Moreover, the flange portion 114 has holes 114c which are formed in the end portions in the Z-axis direction of the inner peripheral portion 114b so that the supporting shafts 76 are inserted therein.

In the pressure sensor 110 shown in FIG. 12, the upper and lower half parts of the pressure sensor 110 with the flange portion 114 disposed therebetween can be assembled independently. The upper and lower half parts are assembled similarly to the third embodiment. After the supporting shafts 76 are connected to the flange portion 74, the side surfaces 80 may be connected to the flange portion 74, and the supporting shafts 76 and the side surfaces 80 may be connected to the flange portion 114. Moreover, the hermetic terminals (not shown) may be attached to the side surfaces 80. When the inside of the housing 112 is opened to the atmosphere, an air inlet opening (not shown) may be formed on the side surfaces 80.

Although the pressure sensor 100 or 110 of the fourth embodiment measures the pressure values associated with two diaphragms independently, the pressure sensor 100 or 110 can be used as a differential pressure sensor which suppresses pressure errors due to the influence of temperature difference or the like since the internal environment of the housing 102 or 112 is the same. In this case, the inside of the housing 102 or 112 may be vacuum-sealed and may be opened to the atmosphere.

The entire disclosure of Japanese Patent Application No. 2010-219087, filed Sep. 29, 2010 is expressly incorporated by reference herein.

What is claimed is:

1. A pressure sensor comprising:
a container;
a pressure receiving member which forms a part of the container and is displaced toward the inner side or the outer side of the container in response to force;
a pressure sensitive element which has a pressure sensing portion and a pair of base portions connected to both ends of the pressure sensing portion, and which has a detection axis parallel to a line connecting the base portions, and in which the detection axis is parallel to a displacement direction of the pressure receiving member, and which detects pressure based on displacement of the pressure receiving member; and
a frame which includes a pair of shock absorbing portions that interposes the pressure sensitive element and is connected to a side of the pressure receiving member close to the peripheral portion or a side of the container close to the pressure receiving member and a beam portion that connects distal ends of the shock absorbing portions,
wherein one of the base portions of the pressure sensitive element is connected to the pressure receiving member, and the other base portion on the opposite side of the base portion is connected to a central portion in a longitudinal direction of the beam portion, and
wherein when the length of the pressure sensitive element is $L_A$, the Young's modulus of the pressure sensitive element is $E_A$, the cross-sectional area of the pressure sensitive element is $S_A$, the length of the shock absorbing portion is $L_B$, the Young's modulus of the shock absorbing portion is $E_B$, and the cross-sectional area of the shock absorbing portion is $S_B$, the following relation is satisfied $$\frac{E_A L_B S_A}{E_B L_A S_B} \geq 1.$$

2. The pressure sensor according to claim 1,
wherein when the length in the longitudinal direction of the beam portion is $L_C$, the Young's modulus of the beam portion is $E_C$, the height of the beam portion is $H_C$, and the width of the beam portion is $W_C$, the following relation is satisfied $$\frac{E_A L_C^3 S_A}{4 E_C L_A H_C^3 W_C} \leq 3.$$

3. The pressure sensor according to claim 2,
wherein the pressure sensitive element and the frame are integrally formed so that an end portion of the base portion of the pressure sensitive element connected to the pressure receiving member and an end portion of the shock absorbing portion connected to the peripheral portion or the opening are arranged on the same straight line.

4. The pressure sensor according to claim 2,
wherein the pressure sensing portion includes at least one columnar beam.

5. The pressure sensor according to claim 2,
wherein the pressure sensitive element and the shock absorbing portion are formed of the same material and have the same lengths in the longitudinal direction thereof.

6. The pressure sensor according to claim 2,
wherein another set of the pressure receiving member, the pressure sensitive element, and the frame is arranged in the housing.

7. The pressure sensor according to claim 1,
wherein the pressure sensitive element and the frame are integrally formed so that an end portion of the base portion of the pressure sensitive element connected to the pressure receiving member and an end portion of the shock absorbing portion connected to the peripheral portion or the opening are arranged on the same straight line.

8. The pressure sensor according to claim 1,
wherein the pressure sensing portion includes at least one columnar beam.

9. The pressure sensor according to claim 1,
wherein the pressure sensitive element and the shock absorbing portion are formed of the same material and have the same lengths in the longitudinal direction thereof.

10. The pressure sensor according to claim 9,
wherein the pressure sensitive element and the shock absorbing portion are formed of the same piezoelectric material so that the longitudinal directions thereof have the same crystal orientation.

11. The pressure sensor according to claim 10,
wherein both ends and a central portion in the longitudinal direction of the beam portion have recesses or slits which have the same shape as the distal end of the shock absorbing portion and the base portion of the pressure sensitive element, and
wherein the shock absorbing portion and the pressure sensitive element are inserted into the recesses or the slits.

12. The pressure sensor according to claim 10,
wherein the pressure receiving member and the beam portion are formed of stainless steel.

13. The pressure sensor according to claim 9,
wherein both ends and a central portion in the longitudinal direction of the beam portion have recesses or slits which have the same shape as the distal end of the shock absorbing portion and the base portion of the pressure sensitive element, and
wherein the shock absorbing portion and the pressure sensitive element are inserted into the recesses or the slits.

14. The pressure sensor according to claim 13,
wherein the pressure receiving member and the beam portion are formed of stainless steel.

15. The pressure sensor according to claim 9,
wherein the beam portion is formed of a material having the same thermal expansion coefficient as the pressure receiving member.

16. The pressure sensor according to claim 9,
wherein the pressure receiving member and the beam portion are formed of stainless steel.

17. The pressure sensor according to claim 1,
wherein another set of the pressure receiving member, the pressure sensitive element, and the frame is arranged in the housing.

18. A pressure sensor comprising:
a container;
a pressure receiving member which forms a part of the container and is displaced toward the inner side or the outer side of the container in response to force;
a pressure sensitive element which has a pressure sensing portion and a pair of base portions connected to both ends of the pressure sensing portion, and which has a detection axis parallel to a line connecting the base portions, and in which the detection axis is parallel to a displacement direction of the pressure receiving member, and which detects pressure based on displacement of the pressure receiving member; and
a frame which includes a pair of shock absorbing portions that interposes the pressure sensitive element and is connected to a side of the pressure receiving member close to the peripheral portion or a side of the container close to the pressure receiving member and a beam portion that connects distal ends of the shock absorbing portions,
wherein one of the base portions of the pressure sensitive element is connected to the pressure receiving member, and the other base portion on the opposite side of the base portion is connected to a central portion in a longitudinal direction of the beam portion, and
wherein the pressure sensitive element and the shock absorbing portion are formed of the same piezoelectric material,
wherein a material of the beam portion is different from a material of the pressure sensitive elemen.

19. The pressure sensor according to claim 18,
wherein the pressure sensing portion includes at least one columnar beam.

20. The pressure sensor according to claim 19,
wherein another set of the pressure receiving member, the pressure sensitive element, and the frame is arranged in the housing.

21. The pressure sensor according to claim 18,
wherein another set of the pressure receiving member, the pressure sensitive element, and the frame is arranged in the housing.

* * * * *